(12) United States Patent
Gysling et al.

(10) Patent No.: US 6,691,584 B2
(45) Date of Patent: *Feb. 17, 2004

(54) FLOW RATE MEASUREMENT USING UNSTEADY PRESSURES

(75) Inventors: Daniel L. Gysling, Glastonbury, CT (US); Rebecca S. Bryant, Glastonbury, CT (US); Charles R. Winston, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/115,727

(22) Filed: Apr. 3, 2002

(65) Prior Publication Data

US 2002/0194932 A1 Dec. 26, 2002

Related U.S. Application Data

(63) Continuation-in-part of application No. 09/346,604, filed on Jul. 2, 1999, and a continuation-in-part of application No. 09/346,605, filed on Jul. 2, 1999, now abandoned, and a continuation-in-part of application No. 09/346,606, filed on Jul. 2, 1999, now abandoned, and a continuation-in-part of application No. 09/346,607, filed on Jul. 2, 1999, and a continuation-in-part of application No. 09/345,827, filed on Jul. 2, 1999.

(51) Int. Cl.$^7$ .................................................. G01F 1/42
(52) U.S. Cl. .................................................. 73/861.42
(58) Field of Search ........................ 73/861.04, 861.42, 73/861.43, 861.44; 250/227.18

(56) References Cited

U.S. PATENT DOCUMENTS

| | | |
|---|---|---|
| 3,149,492 A | 9/1964 | Weinberg |
| 3,851,521 A | 12/1974 | Ottenstein |
| 4,080,837 A | 3/1978 | Alexander |
| 4,114,439 A | 9/1978 | Fick |
| 4,144,768 A | 3/1979 | Andersson |
| 4,159,646 A | 7/1979 | Paulsen |
| 4,164,865 A | 8/1979 | Hall |
| 4,236,406 A | 12/1980 | Reed |
| 4,275,602 A | 6/1981 | Fujishiro |

(List continued on next page.)

FOREIGN PATENT DOCUMENTS

| | | |
|---|---|---|
| DE | 19511234 | 12/1995 |
| EP | 0684458 | 5/1995 |
| FR | 2 357 868 | 7/1976 |
| JP | 406082281 | 9/1992 |
| WO | WO 93/14382 | 7/1993 |
| WO | WO 96/04528 | 2/1996 |
| WO | WO 00/00793 | 1/2000 |

OTHER PUBLICATIONS

Mesch, F. (1990) "Speed and Flow Measurement by an Intelligent Correlation System", Advances in Instrumentation and Control, Research Triangle Park, NC, part 4, P.1899–1914.

(List continued on next page.)

Primary Examiner—Harshad Patel
(74) Attorney, Agent, or Firm—Moser, Patterson & Sheridan, L.L.P.

(57) ABSTRACT

According to one embodiment of the present invention, the apparatus comprises a first filter for measuring a pressure field at a first axial location along the pipe and providing a first pressure signal indicative of the vortical pressure field. The apparatus further comprises a second filter for measuring the vortical pressure field at a second axial location along the pipe and providing a second pressure signal indicative of the vortical pressure field. The apparatus further comprises a signal processor, responsive to the first and the second pressure signals, which provides a velocity signal indicative of a velocity of the vortical pressure field moving in the pipe.

180 Claims, 17 Drawing Sheets

U.S. PATENT DOCUMENTS

| | | |
|---|---|---|
| 4,445,389 A | 5/1984 | Potzick |
| 4,499,418 A | 2/1985 | Helms |
| 4,515,473 A | 5/1985 | Mermelstein |
| 4,520,320 A | 5/1985 | Potzick |
| 4,546,649 A | 10/1985 | Kantor |
| 4,706,501 A | 11/1987 | Atkinson |
| 4,788,852 A | 12/1988 | Martin |
| 4,813,270 A | 3/1989 | Baillie |
| 4,862,750 A | 9/1989 | Nice |
| 4,864,868 A | 9/1989 | Khalifa |
| 4,884,457 A | 12/1989 | Hatton |
| 4,896,540 A | 1/1990 | Shakkottai |
| 4,932,262 A | 6/1990 | Wlodarczyk |
| 4,947,127 A | 8/1990 | Helms |
| 4,950,883 A | 8/1990 | Glenn |
| 4,976,151 A | 12/1990 | Morishita |
| 4,996,419 A | 2/1991 | Morey |
| 5,024,099 A | 6/1991 | Lee |
| 5,031,460 A | 7/1991 | Kanenobu |
| 5,040,415 A | 8/1991 | Barkhoudarian |
| 5,051,922 A | 9/1991 | Toral |
| 5,058,437 A | 10/1991 | Chaumont |
| 5,083,452 A | 1/1992 | Hope |
| 5,099,697 A | 3/1992 | Agar |
| 5,115,670 A | 5/1992 | Shen |
| 5,152,181 A | 10/1992 | Lew |
| 5,207,107 A | 5/1993 | Wolf |
| 5,218,197 A | 6/1993 | Carroll |
| 5,317,576 A | 5/1994 | Leonberger |
| 5,321,991 A | 6/1994 | Kalotay |
| 5,347,873 A | 9/1994 | Vander Heyden |
| 5,361,130 A | 11/1994 | Kersey |
| 5,363,342 A | 11/1994 | Layton |
| 5,367,911 A | 11/1994 | Jewell |
| 5,372,046 A | 12/1994 | Kleven |
| 5,398,542 A | 3/1995 | Vasbinder |
| 5,401,956 A | 3/1995 | Dunphy |
| 5,426,297 A | 6/1995 | Dunphy |
| 5,440,932 A | 8/1995 | Wareham |
| 5,493,390 A | 2/1996 | Varasi |
| 5,493,512 A | 2/1996 | Peube |
| 5,513,913 A | 5/1996 | Ball |
| 5,564,832 A | 10/1996 | Ball |
| 5,576,497 A | 11/1996 | Vignos |
| 5,591,922 A | 1/1997 | Segeral |
| 5,597,961 A | 1/1997 | Marrelli |
| 5,639,667 A | 6/1997 | Heslot |
| 5,642,098 A | 6/1997 | Santa Maria |
| 5,644,093 A | 7/1997 | Wright |
| 5,654,551 A | 8/1997 | Watt |
| 5,670,720 A | 9/1997 | Clark |
| 5,680,489 A | 10/1997 | Kersey |
| 5,689,540 A | 11/1997 | Stephenson |
| 5,708,211 A | 1/1998 | Jepson |
| 5,730,219 A | 3/1998 | Tubel |
| 5,732,776 A | 3/1998 | Tubel |
| 5,741,980 A | 4/1998 | Hill |
| 5,803,167 A | 9/1998 | Bussear |
| 5,804,713 A | 9/1998 | Kluth |
| 5,842,347 A | 12/1998 | Kinder |
| 5,845,033 A | 12/1998 | Berthold |
| 5,906,238 A | 5/1999 | Carmody |
| 5,907,104 A | 5/1999 | Cage |
| 5,908,990 A | 6/1999 | Cummings |
| 5,925,821 A | 7/1999 | Bousquet |
| 5,925,879 A | 7/1999 | Hay |
| 5,939,643 A | 8/1999 | Oertel |
| 5,956,132 A | 9/1999 | Donzier |
| 5,959,547 A | 9/1999 | Tubel |
| 5,963,880 A | 10/1999 | Smith |
| 5,975,204 A | 11/1999 | Tubel |
| 5,992,519 A | 11/1999 | Ramakrishnan |
| 5,996,690 A | 12/1999 | Shaw |
| 6,002,985 A | 12/1999 | Stephenson |
| 6,003,383 A | 12/1999 | Zielinska |
| 6,003,385 A | 12/1999 | De Vanssay |
| 6,009,216 A | 12/1999 | Pruett |
| 6,016,702 A | 1/2000 | Maron |
| 6,158,288 A | 12/2000 | Smith |
| 6,216,532 B1 | 4/2001 | Stephenson |
| 6,233,374 B1 | 5/2001 | Ogle |
| 6,279,660 B1 | 8/2001 | Hay |
| 6,354,147 B1 | 3/2002 | Gysling |

OTHER PUBLICATIONS

Specification for U.S. patent application Ser. No. 09/344,069, filed Jun. 25, 1999, Attorney docket: WEAF:106.

Gysling, D. (1999) "Development of a Fiber Optic Downhole Multiphase Flow Meter", in "Field Application & New Technologies for Multiphase Metering", Multiphase Technology Series Conference, Aberdeen Scotland.

Beranek, L. and Ver, I. (1992) in "Noise and Vibration Control Engineering, Principles and Application", John Wiley & Sons, Inc., Chapter 14, p:537–541.

Dowling, A. and Williams, J. in "Sound and Sources of Sound", Ellis Horwood Limited, Section 4, p:79–80.

Kersey, A. et al. (1993) "Multiplexed Fiber Bragg Grating Strain–Sensor System with a Fiber Fabry–Perot Wavelength Filter", Optics Letters, 18:1370–1372.

Dandridge, A. & Cogdell, G. (1991) "Fiber Optic Sensors for Navy Applications", IEEE, LCS, 2:81–89.

Nielsen, R. (1991) "Sonar Signal Processing", Artech Huse Inc., Chapter 2, p:51–59.

Krim A. and Viberg M. (1996) "Two Decades of Array Signal Processing Research", IEEE Signal Processing Magazine, p:67–94.

Kersey A. and Darkin, J., Editors (1992) SPIE vol. 1586, "Distributed and Multiplexed Fiber Optic Sensors", p:1–243.

Nerby et al. "A cost effective technique for production well testing", (1995) Offshore Technology Conference, p:505–515.

"Noise and Vibration Control Engineering Principles and Applications", Leo L. Beranek and Istvan L. Ver, A Wiley Interscience Publication, pp. 537–541.

Mandrel–Wound Fiber Optic Pressure Sensor, P. Ogle, D. Gysling and A. Kersey, Docket CC–0033, pp. 1–22.

CiDRA Presentation on "Flow Meter", Dec. 7–18, 1998, Houston,TX.

"Sound and Sources of Sound", by A.P. Dowling and J.E. Williams, pp. 224–229.

"Speed and Flow Measurement by an Intelligent Correlation System" by Franz Mesch, Advances in Instrumentation and Control, 45 (1990) Part 4. Research Triangle Park, NC, US.

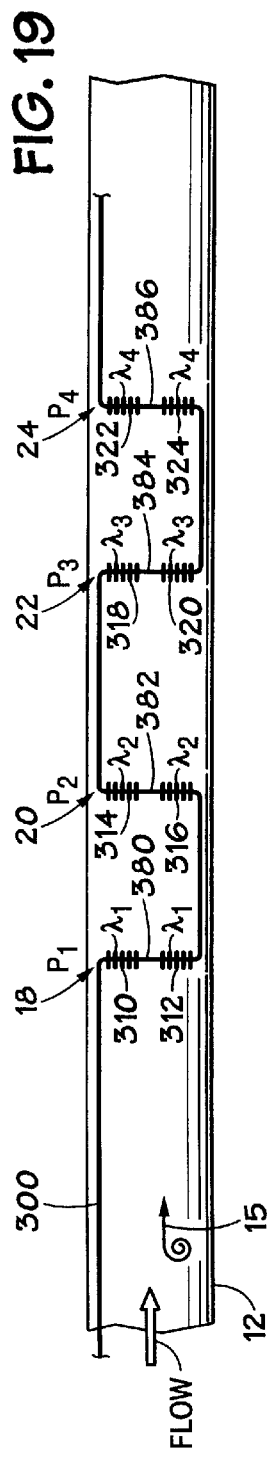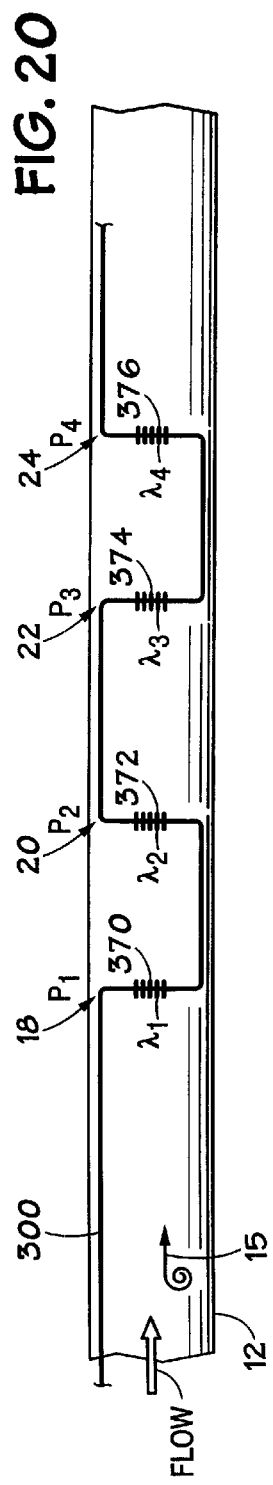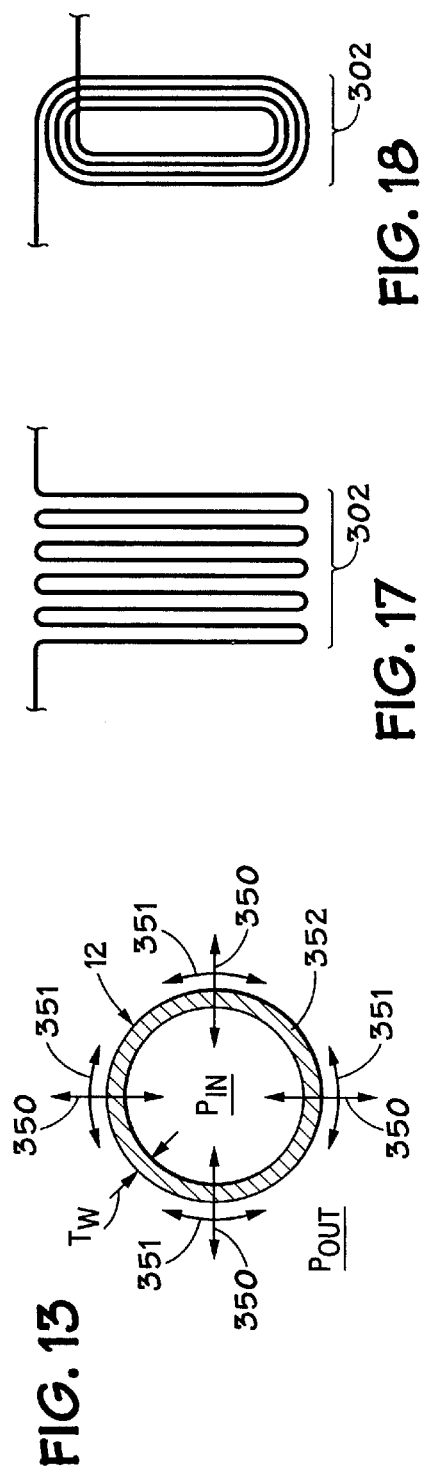

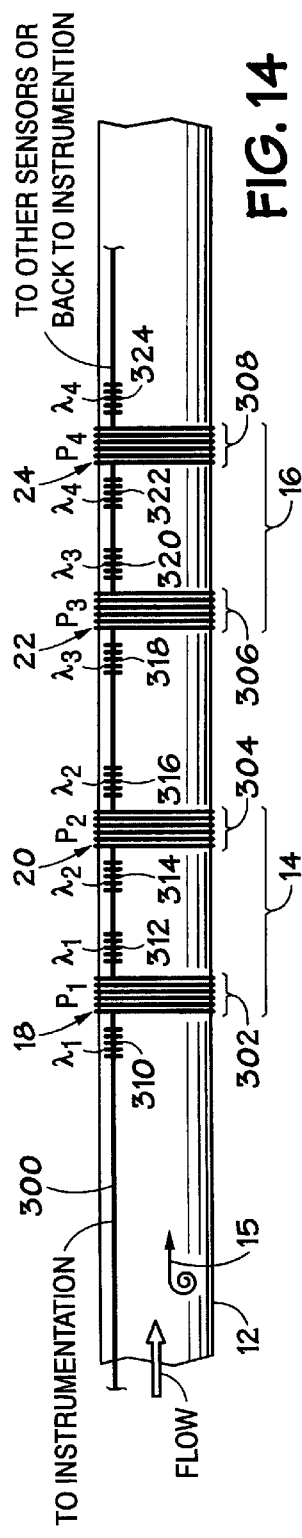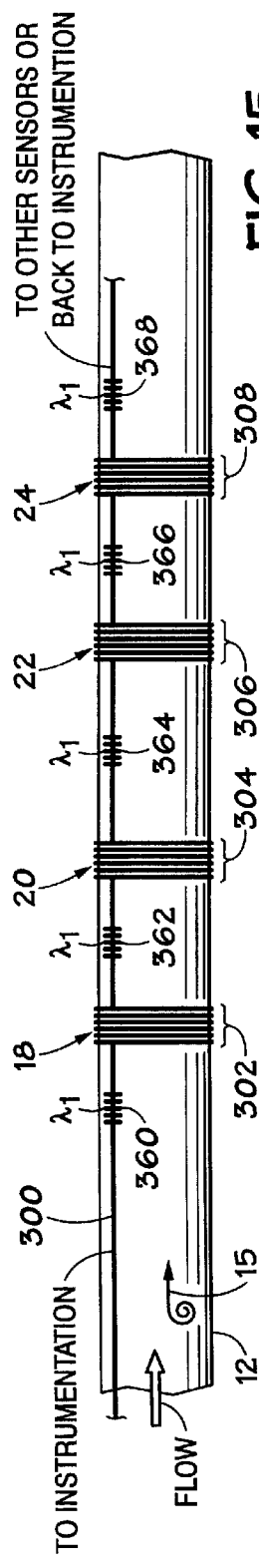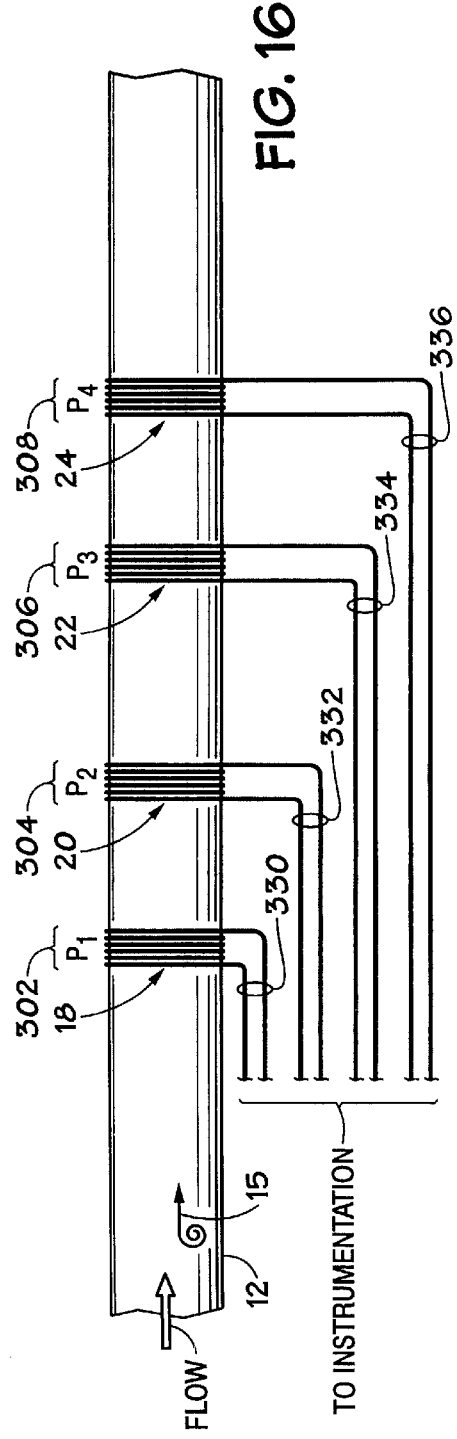

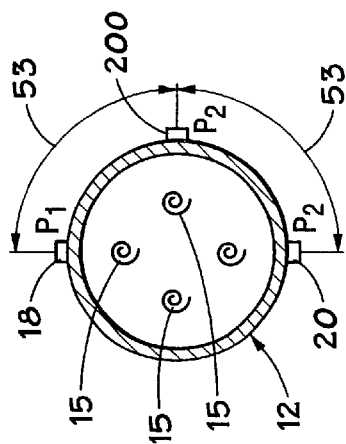
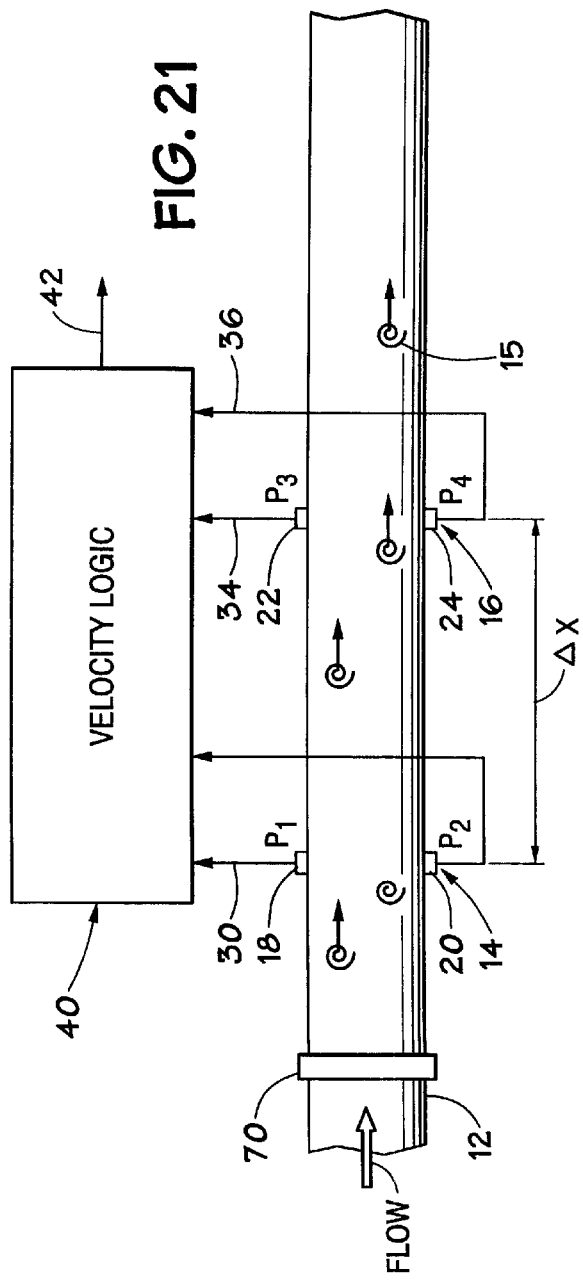
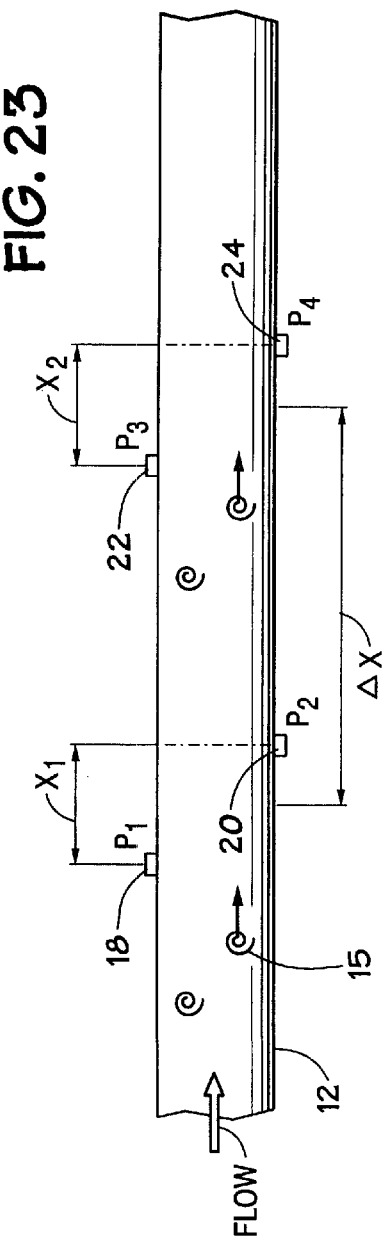

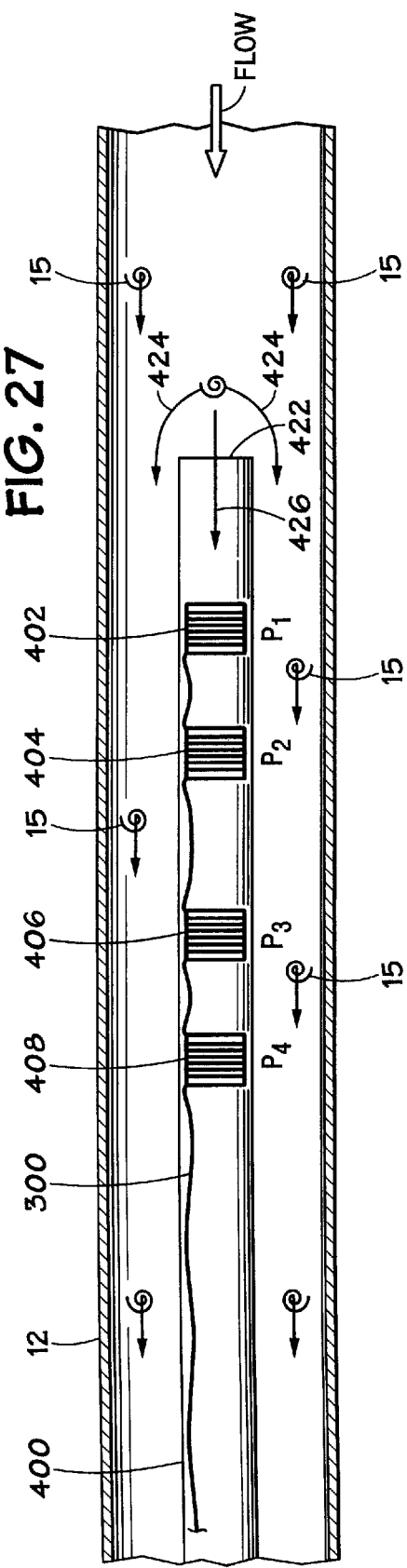
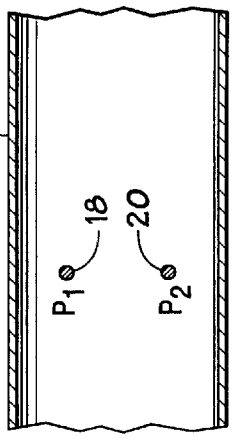
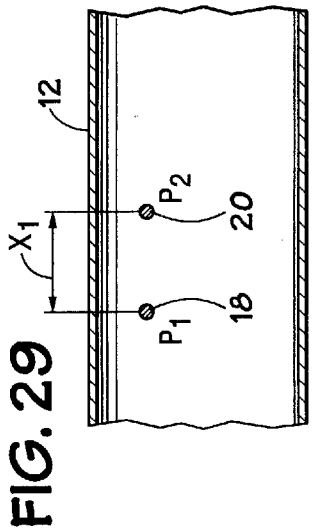
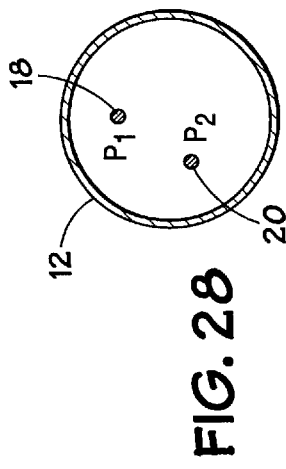
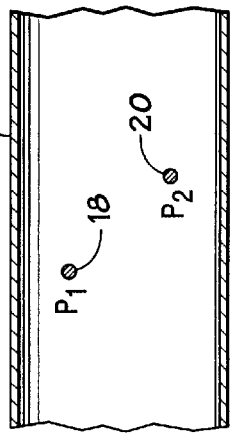

FLOW RATE MEASUREMENT USING UNSTEADY PRESSURES

RELATED APPLICATIONS

This application is a continuation-in-part of U.S. patent application Ser. Nos. 09/346,604, 09/346,605 now abn, 09/346,606 now abn., 09/346,607 and 09/345,827, all filed Jul. 2, 1999. These applications are all hereby incorporated by reference in their entireties. Priority is claimed to these prior applications under 35 U.S.C. §120.

BACKGROUND

In many industries it is desirable to measure the flow rate of a multiphase fluid. In the oil and gas industry, or comparable industries, for example, it is desirable to measure the flow rate of multiphase fluids, especially fluids having three phases, such as oil, water and gas. It is known also to measure the flow rate of certain fluids (one or more liquids and/or gases) in a pipe using cross-correlating flow meters. Such meters measure an element of the flow that moves or convects with (or is related to) the fluid flow (or a group of fluid particles). The meter measures this element at two locations separated by a known distance along the flow path and then calculates the time for such element to move between the two locations. The time delay is determined by a cross-correlation of the two measured signals. A velocity is then determined by the distance between the measurements divided by the time delay. The flow velocity is then related to the flow rate by calibration.

One such cross-correlation meter that measures flow rate in a multiphase flow is described in U.S. Pat. No. 5,591,922, entitled "Method and Apparatus for Measuring Multiphase Flow," to Segeral et al, issued Jan. 7, 1997. In that case, a pair of venturis are located a predetermined distance apart which induce a change in flow speed through the venturi and a resulting pressure difference (or delta-P) across each venturi, which are measured. The delta-P pressure signals measured at each venturi are cross-correlated to determine a time delay that is indicative of the total volume flow rate. However, such a technique requires changing the flow properties (e.g., flow velocity or density) at the two measurement points to make the measurement. Also, the delta-P is generated at a contracted or constricted area, and is not a naturally occurring observable characteristic of the fluid.

SUMMARY OF THE INVENTION

According to the present invention, an apparatus for measuring a velocity of a fluid or fluid mixture moving in a pipe is provided. The apparatus comprises a spatial array of unsteady pressure sensors disposed on the pipe, the sensors providing a corresponding array of unsteady pressure signals. A signal processor is also provided which is responsive to the array of unsteady pressure signals and provides a velocity signal indicative of a velocity of a vortical pressure field moving in the pipe.

According to one embodiment of the present invention, the apparatus comprises a first filter for measuring a vortical pressure field at a first axial location along the pipe and providing a first pressure signal indicative of the vortical pressure field. The apparatus further comprises a second filter for measuring the vortical pressure field at a second axial location along the pipe and providing a second pressure signal indicative of the vortical pressure field. The apparatus also comprises a signal processor, responsive to the first and the second pressure signals, which provides a velocity signal indicative of a velocity of the vortical pressure field moving in the pipe. The vortical pressure field may comprise vortices, or other stochastic or inhomogeneous pressure disturbances within the flow. As used herein, the term vortical pressure field is interchangeable with the term inhomogeneous pressure field, and one term is not exclusive of the other.

According further to the present invention, the first and the second filters pass wavelengths associated with the vortical pressure field and do not pass wavelengths associated with an acoustic pressure field. According further to the present invention, the first filter comprises a first spatial filter and the second filter comprises a second spatial filter. According further to the present invention, the spatial filters filter out wavelengths above a predetermined wavelength. Still further according to the present invention, at least one of the pressure sensors comprises a strain gauge disposed on a surface of the pipe. Further according to the present invention, the strain gauge comprises a fiber optic strain gauge.

Still further according to the present invention, the signal processor comprises logic which calculates a cross-correlation between the first and the second vortical pressure signals and which provides a time delay signal indicative of the time it takes for the vortical pressure field to move from the first location to the second location. Further according to the present invention, the velocity signal is indicative of the velocity of the fluid moving in the pipe.

The present invention provides a significant improvement over the prior art by providing a measurement of the average flow rate of fluid or fluid mixture flow in a pipe or other conduit without requiring a flow restriction in the pipe or any other change in the flow velocity of the fluid. As used herein, fluid is defined as one or more liquids and/or gasses, where the gas(es) may be dissolved in the liquid or in free gas form, such as bubbles or in slugs. The fluid may also include non-liquid elements as well, such as sand, particulates, slurry, etc., as will be discussed more below.

The present invention determines a convection velocity by measuring unsteady (or dynamic or ac) pressures and extracting the pressure signal indicative of a vortical pressure (or flow) field which convects at or near the average velocity of the fluid. The vortical pressure field is then used to determine the convection velocity by cross-correlation techniques, such convection velocity being proportional (or approximately equal to) the flow rate of the fluid. If needed, the flow rate of the fluid may then be determined by calibrating the convection velocity to the flow rate.

The invention may also be used to measure the velocity of any inhomogeneous flow field, such as gas bubbles, gas slugs, particles, or chunks of material, and its associated pressure field that propagates in a flow, provided the spatial filters have a separation within the acceptable coherence length of the flow field to be measured and the sensor spacing within each spatial filter is longer than a characteristic spatial (axial or transverse) length of the flow field. Also, the invention may be used to detect different flow rates within the same mixture (e.g., the flow rate of a vortical pressure field as well as other inhomogeneous pressure fields).

Also, the invention may be used with any combination of liquids and/or gases and may include particles. For example, the invention may be used as a flow meter for use in oil or gas wells to determine the flow rate of a multiphase fluid, such as a three-phase fluid of oil, water, and gas. The invention will also work in any other environment or application or with any other fluids or fluid mixtures. The invention will work with any pipe or tube or with any conduit that carries fluid. Also, the invention has no inherent flow range limitations, and, as such, can measure very low flow rates and has no maximum flow rate limit. The invention will also work if the fluid is flowing in either direction in the pipe. Further, the invention may be used directly on a pipe or on a tube inserted into a flowing fluid.

The foregoing and other objects, features and advantages of the present invention will become more apparent in light of the following detailed description of exemplary embodiments thereof.

BRIEF DESCRIPTION OF THE DRAWINGS

FIG. 13 is an end view of a pipe showing pressure inside and outside the pipe.

FIG. 14 is a side view of a pipe having optical fiber wrapped around the pipe at each unsteady pressure measurement location and a pair of Bragg gratings around each optical wrap.

FIG. 15 is a side view of a pipe having optical fiber wrapped around the pipe at each unsteady pressure measurement location with a single Bragg grating between each pair of optical wraps.

FIG. 16 is a side view of a pipe having optical fiber wrapped around the pipe at each unsteady pressure measurement location without Bragg gratings around each of the wraps.

FIG. 17 is an alternative radiator geometry of an optical wrap of FIGS. 14, 15 & 16.

FIG. 18 is an alternative race track geometry of an optical wrap of FIGS. 14, 15 & 16.

FIG. 19 is a side view of a pipe having a pair of gratings at each axial sensing location.

FIG. 20 is a side view of a pipe having a single grating at each axial sensing location.

FIG. 21 is a side view of a pipe having two pairs of pressure sensors where the sensors in each pair are located across the pipe from each other.

FIG. 22 is an end view of a pipe showing a pair of pressure sensors located at various circumferential spacings from each other.

FIG. 23 is a side view of a pipe having two pairs of pressure sensors where the sensors in each pair are located transversely across the pipe and spaced axially along the pipe from each other.

FIG. 27 is a side view of a pipe having an inner tube with four axially distributed optical fiber wrapped hydrophones located within the tube.

FIG. 28 is an end view of a pipe showing a pair of pressure sensors spaced apart from each other within the pipe.

FIG. 29 is a side view of a pipe having a pair of unsteady pressure sensors spaced axially within the pipe.

FIG. 30 is a side view of a pipe having a pair of unsteady pressure sensors spaced transversely within the pipe.

FIG. 31 is a side view of a pipe having a pair of unsteady pressure sensors axially and radially spaced within the pipe.

DETAILED DESCRIPTION OF THE INVENTION

Figure 1:
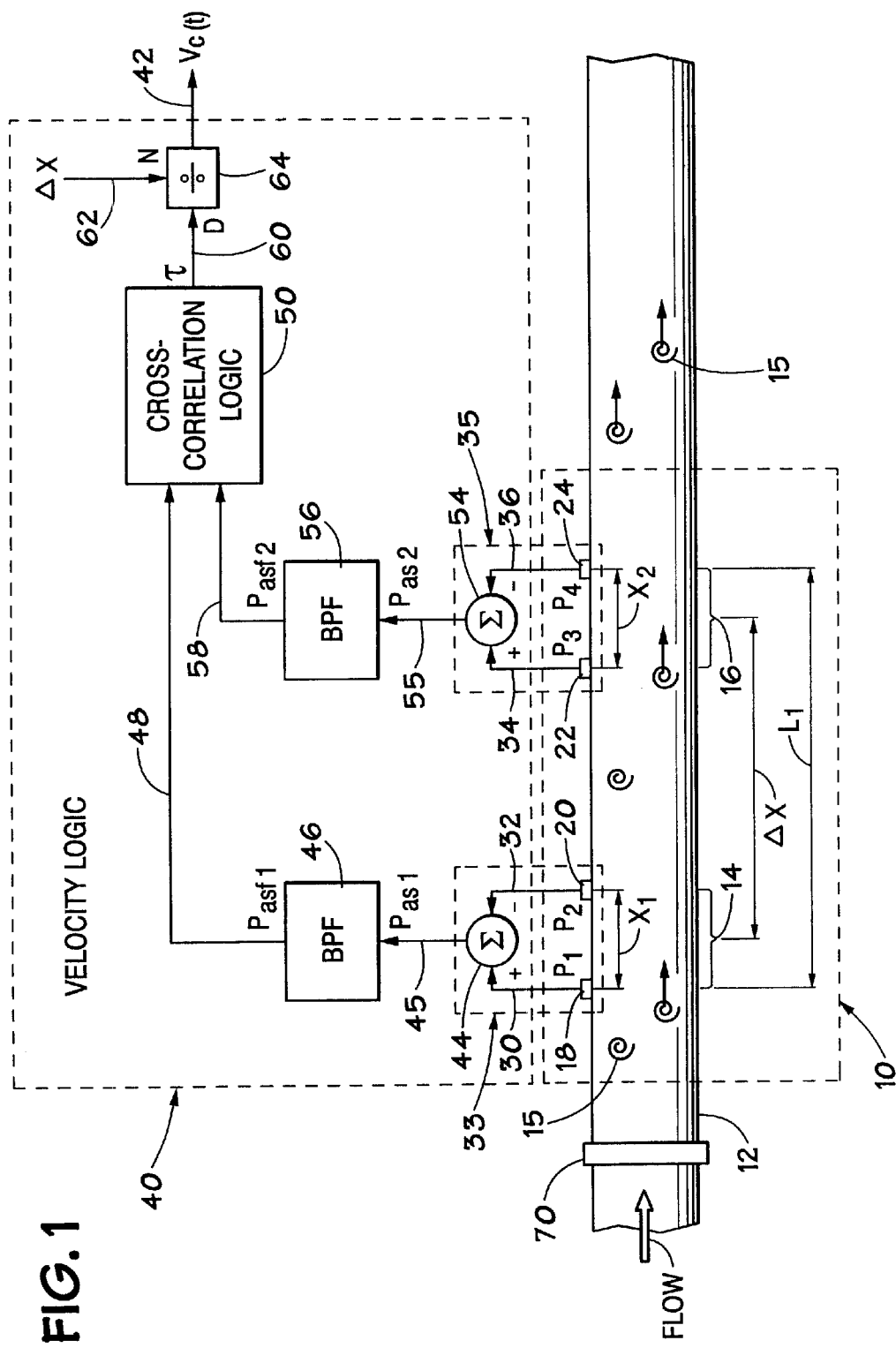
FIG. 1 is a schematic block diagram of a velocity measurement system.

The velocity and flow measurement system of FIG. 1 utilizes pressure sensors to provide a signal indicative of the velocity of a fluid or of at least one of the fluids in a fluid mixture flowing in the pipe. The velocity and flow system will work over a wide range of mixtures of, for example, oil, water, and/or gas within the pipe. The various constituents have pressure disturbances convecting therewith having particular axial and coherence lengths. The present invention utilizes an array of spatial filters to detect and identify the various pressure disturbances, such as vortical pressure disturbances, in the fluid or in a particular constituent within the mixture. Once detected, the pressure disturbances are filtered to obtain a convection velocity.

Referring to FIG. 1, a system for detecting and measuring vortical pressure disturbances in a fluid moving in a pipe to determine the velocity and flow of the fluid includes a sensing section 10 along a pipe 12 and a velocity logic section 40. The pipe (or conduit) 12 has two measurement regions 14,16 located a distance ΔX apart along the pipe 12. At the first measurement region 14 are two pressure sensors 18,20, located a distance $X_1$ apart, capable of measuring the unsteady pressure in the pipe 12, and at the second measurement region 16, are two other unsteady pressure sensors 22,24, located a distance $X_2$ apart, capable of measuring the unsteady pressure in the pipe 12. Each pair of pressure sensors 18,20 and 22,24 act as spatial filters to remove certain acoustic signals from the unsteady pressure signals, and the distances $X_1, X_2$ are determined by the desired filtering characteristic for each spatial filter, as discussed below.

The flow measurement system 10 of the present invention measures velocities associated with unsteady flow fields and/or pressure disturbances represented by 15. Such pressure disturbances could represent turbulent eddies (or vortical flow fields), inhomogeneities in the flow (such as bubbles, slugs, and the like), or any other properties of the flow having time varying or stochastic properties that are manifested at least in part in the form of unsteady pressures. Flow fields 15 are, in general, comprised of pressure disturbances having a wide variation in length scales and which have a variety of coherence length scales, such as those described in the reference "Sound and Sources of Sound," A. P. Dowling et al., Halsted Press, 1983, which is incorporated herein by reference. Certain of these flow fields convect at, or near to, or are related to, the mean velocity of a fluid or of at least one of the fluids within a mixture flowing in a pipe. More specifically, vortices convect in a predictable manner with reference to such fluids or mixtures. The flow fields 15 have temporal and spatial length scales as well as coherence length scales that differ from other disturbances in the flow. The present invention utilizes these properties to preferentially select disturbances of a desired spatial (axial or transverse) length scale and coherence length scale as will be more fully described below. For illustrative purposes, the terms vortical flow field and vortical pressure field will be used to describe the above-described group of unsteady pressure fields having temporal and spatial length and coherence scales described herein.

The pressures $P_1, P_2, P_3, P_4$ present at each of the sensors 18–24 may be measured through holes in the pipe 12 ported to sensors or by other techniques discussed below. The pressure sensors 18,20,22,24 provide time-based pressure signals $P_1(t), P_2(t), P_3(t), P_4(t)$ on lines 30,32,34,36, respectively, to velocity logic 40, which provides a convection velocity signal $V_c(t)$ on a line 42. $V_c(t)$ is related to an average flow rate $V_f(t)$ of the fluid flowing in the pipe 12.

As one skilled in the art will recognize, some or all of the functions performed by velocity logic 40 may be implemented in software (using a microprocessor or computer) and/or firmware, or may be implemented using analog and/or digital hardware having sufficient memory, interfaces, and capacity to perform the functions described herein.

In one embodiment, the pressure signal $P_1(t)$ on line 30 is provided to a positive input of a summer 44 and the pressure signal $P_2(t)$ on line 32 is provided to a negative input of the summer 44. The output of the summer 44 is provided on a line 45 indicative of the difference between the two pressure signals $P_1, P_2$ (e.g., $P_1-P_2=P_{as1}$). The inputs to summer 44 may be swapped with the pressure signal $P_1(t)$ on line 30 provided to the negative input and the pressure signal $P_2(t)$ on line 32 provided to the positive input without departing from the present invention.

The pressure sensors 18,20 together with the summer 44 create a spatial filter 33. Line 45 is fed to bandpass filter 46, which passes a predetermined passband of frequencies and attenuates frequencies outside the passband. In accordance with the present invention, the passband of the filter 46 is set to filter out (or attenuate) the dc portion and the high frequency portion of the input signals and to pass the frequencies therebetween. For example, in a particular embodiment, passband filter 46 is set to pass frequencies from about 1 Hz to about 100 Hz, which is a useful range for detecting pressure disturbances in a 3-inch inside-diameter pipe flowing water at 10 ft/sec. Other passbands may be used in other embodiments, if desired. Passband filter 46 provides a filtered signal $P_{asf}1$ on a line 48 to cross-correlation logic 50, described further below.

The pressure signal $P_3(t)$ on line 34 is provided to a positive input of a summer 54 and the pressure signal $P_4(t)$ on line 36 is provided to a negative input of the summer 54. The pressure sensors 22,24 together with the summer 54 create a spatial filter 35. The output of the summer 54 is provided on a line 55 indicative of the difference between the two pressure signals $P_3, P_4$ (e.g., $P_3-P_4=P_{as2}$). The line 55 is fed to a bandpass filter 56, similar to the bandpass filter 46 discussed above, which passes frequencies within the passband and attenuates frequencies outside the passband. The filter 56 provides a filtered signal $P_{asf}2$ on line 58 to cross-correlation logic 50. The signs on the summers 44,54 may be swapped if desired, provided the signs of both summers 44,54 are swapped together. In addition, the pressure signals $P_1, P_2, P_3, P_4$ may be scaled prior to presentation to the summers 44,54.

Signals $P_{asf}1$ and $P_{asf}2$ on lines 48,58, respectively, are indicative of the presence of a pressure disturbance (such as vortices) in a flow field 15, which occur in sensing regions 14, 16, respectively. The cross-correlation logic 50 calculates a well-known time domain cross-correlation between the signals $P_{asf}1$ and $P_{asf}2$ on the lines 48,58, respectively, and provides an output signal on a line 60 indicative of the time delay τ it takes for an vortical flow field 15 to propagate from one sensing region 14 to the other sensing region 16. Vortical flow disturbances, as is known, are coherent dynamic conditions that can occur in the flow, and which substantially decay (by a predetermined amount) over a predetermined distance (or coherence length) and convect (or flow) at or near the average velocity of the fluid flow. As described above, a flow field 15 also has a stochastic or vortical pressure disturbance associated with it. In general, the vortical flow disturbances 15 are distributed throughout the flow, particularly in high shear regions, such as boundary layers (e.g., along the inner wall of the pipe 12) and are shown herein as discrete vortical flow fields 15. Because the vortical flow fields 15 (and the associated pressure disturbance) convect at or near the mean flow velocity, the propagation time delay τ is related to the velocity of the flow, the distance ΔX between the measurement regions 14,16 being known.

Although pressure disturbances associated with flow fields 15 occur naturally in most flow conditions, an optional circumferential groove 70 may be used in the inner diameter of the pipe 12 to help generate vortices into the flow. However, the groove 70 is not required for the present invention to operate, which can operate using pressure disturbances occurring naturally in the flow of the fluid(s) within the pipe. However, should it be desired in a given application, a plurality of axially spaced grooves may be used to generate further vortices. The dimensions and geometry of the groove(s) 70 may be set based on the expected flow conditions and other factors. The axial cross-sectional shape of the groove 70 may be rectangular, square, triangular, circular, oval, star, or other shapes. Other techniques may be used as vortex generators if desired including those that may protrude within the inner diameter of pipe 12.

A spacing signal ΔX on line 62, indicative of the distance ΔX between the sensing regions 14,16, is divided by the time delay signal τ on the line 60 by a divider 64 which provides an output signal on the line 42 indicative of the convection velocity $V_c(t)$ of the fluid flowing in the pipe 12, which is related to (or proportional to or approximately equal to) the average (or mean) flow velocity $V_f(t)$ of the fluid, as defined below:

$$V_c(t) = \Delta X/\tau \propto V_f(t) \qquad \text{Eq. 1}$$

The convection velocity $V_c(t)$ may then be calibrated to more precisely determine the mean velocity $V_{f(t)}$ if desired. The result of such calibration may require multiplying the value of the convection velocity $V_c(t)$ by a calibration constant (gain) and/or adding a calibration offset to obtain the mean flow velocity $V_{f(t)}$ with the desired accuracy. Other calibration may be used if desired. For some applications, such calibration may not be required to meet the desired accuracy. The velocities $V_f(t)$, $V_c(t)$ may be converted to volumetric flow rate by multiplying the velocity by the cross-sectional area of the pipe.

Other configurations similar to that shown in FIG. 1 are possible. Thus, several filters can be used in combination with velocity logic 40 to determine flow rate properties of a fluid or a mixture of fluids. In a multi-filter embodiment, various spacing signals ΔX on a line 62 indicative of the distances $\Delta X_1$, $\Delta X_2$, $\Delta X_3$, $\Delta X_4$ between the sensing regions are divided by the various time delay signals τ associated with each time lag between the filters. Each divider 64 provides various output signals on the line 42 indicative of convection velocities $V_c(t)_1$, $V_c(t)_2$, $V_c(t)_3$, which, for example, each relate to a particular constituent of a three constituent mixture of fluids flowing in the pipe 12. The various convection velocities are related to (or proportional to or approximately equal to) the average (or mean) flow velocity $V_f(t)_1$, $V_f(t)_2$, $V_f(t)_3$ of the various constituents of the fluid mixture. The velocities $V_c(t)_1$, $V_c(t)_2$, $V_c(t)_3$ and $V_f(t)_1$, $V_f(t)_2$, $V_f(t)_3$ may be converted to volumetric flow rate if there is sufficient knowledge of the phase concentrations and cross sectional area of the pipe. Such configurations as shown in the figures may also be used to determine a mean velocity for the fluid mixture, as will be described later.

Figure 36:
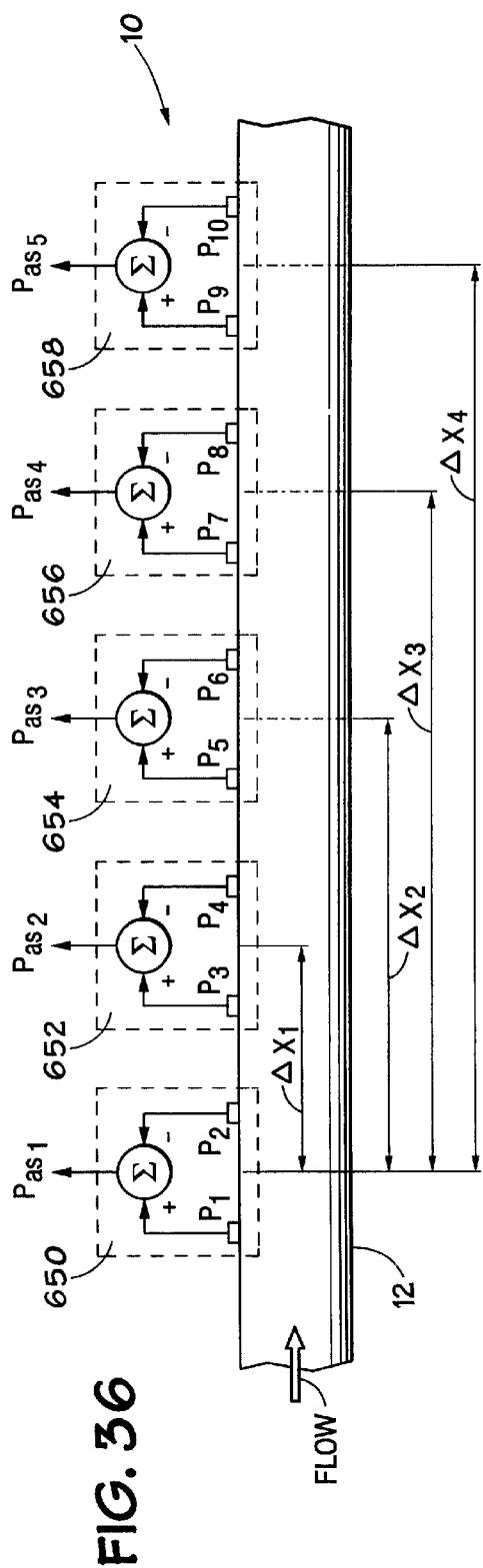
FIG. 36 is a side view of a pipe having a plurality of spatial filters along an axial array with varying distances from a first filter.

Referring to FIG. 36, a single sensor system 10 is shown having more than one pair of unsteady pressure sensors having different spacings to measure multiple flow rates in the same mixture. The invention may have an array of pressure sensors configured as spatial filters 650–658 each having a predetermined spacing $\Delta X_1$-$\Delta X_4$ between the first and each successive spatial filter. The spatial filters 650–658 may variously be combined with velocity logic 40 as is described above. Such a configuration may be used to measure the flow fields and the corresponding velocities for various constituents associated with a variety of unsteady and/or stochastic pressure fields within the fluid or fluid mixture.

Figure 37:
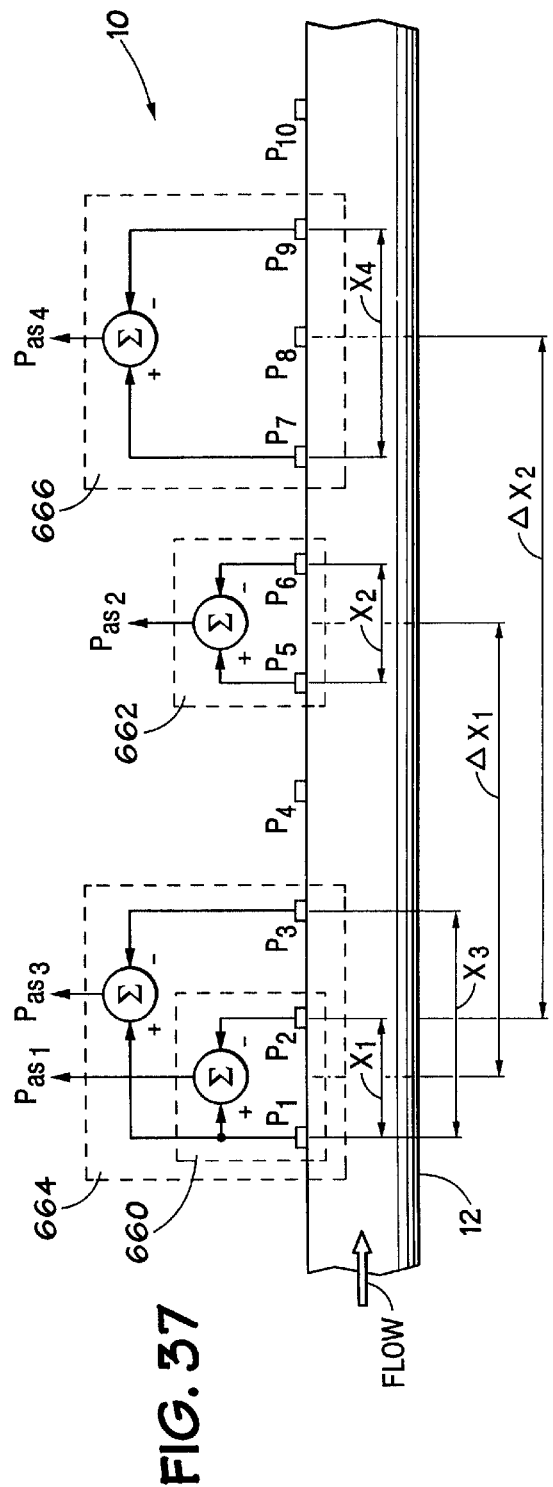
FIG. 37 is a side view of a pipe having a plurality of spatial filters along an axial array with varying distances between filters and each filter having a different sensor spacing.

Referring to FIG. 37, alternatively, different pairs of spatial filters may have different internal spacing between sensors as well as different spacing between spatial filters. For example, a first pair of spatial filters 660,662 each has the same sensor spacing $X_1$, $X_2$, and a filter spacing of $\Delta X_1$, and a second pair of spatial filters 664,666 each has the same sensor spacing $X_3$, $X_4$ (different from the first sensor spacing $X_1$,$X_2$) and a filter spacing of $\Delta X_2$ (different from the first filter spacing $\Delta X_1$). The spatial filters 660–666 may also be variously combined with velocity logic 40 (FIG. 1) as described above. Similarly, such a configuration may be used to measure the various pressure fields and the corresponding flow velocities for the fluid or for various constituents within the mixture.

Figure 38:
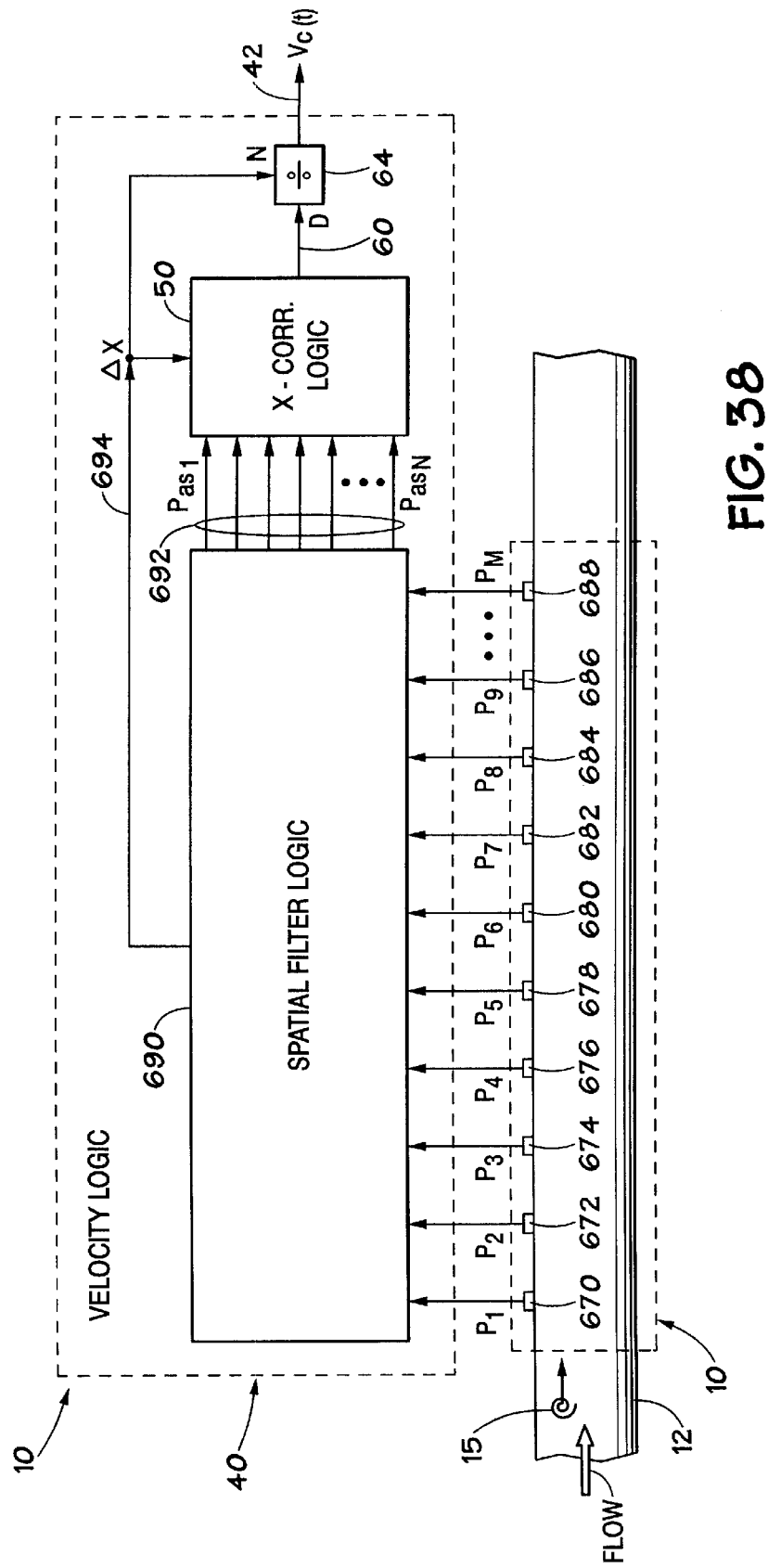
FIG. 38 is a schematic block diagram of a velocity measurement system having a plurality of spatial filters along an axial array along a pipe.

Referring to FIG. 38, in general, unsteady pressure signals $P_1$–$P_m$ from a phased array of equally or unequally spaced ac pressure sensors 670–688 may be fed to spatial filter logic 690 which combines the sensor signals in various groupings to create multiple spatial filters and filter spacings which may be automatically reconfigured to select the desired spacing (e.g., $X_1$,$X_2$) between sensors within each spatial filter and the desired spacing (ΔX) between the spatial filters. In that case, the spatial filter logic 690 may provide a plurality of spatially filtered signals $P_{as1}$–$P_{asn}$ on lines 692 to the cross-correlation logic 50 which selects the desired two input signals to cross-correlate based on a spacing signal ΔX on a line 694 from the filter logic 690. Also, the signal ΔX is fed to the numerator N input of the divider 64 for the calculation of the velocity signal $V_c(t)$ on line 42. Alternatively, the logic 690 may provide only the two signals selected to be cross-correlated. In that case, the input ΔX would not need to be fed to the cross-correlation logic 50.

Figure 2:
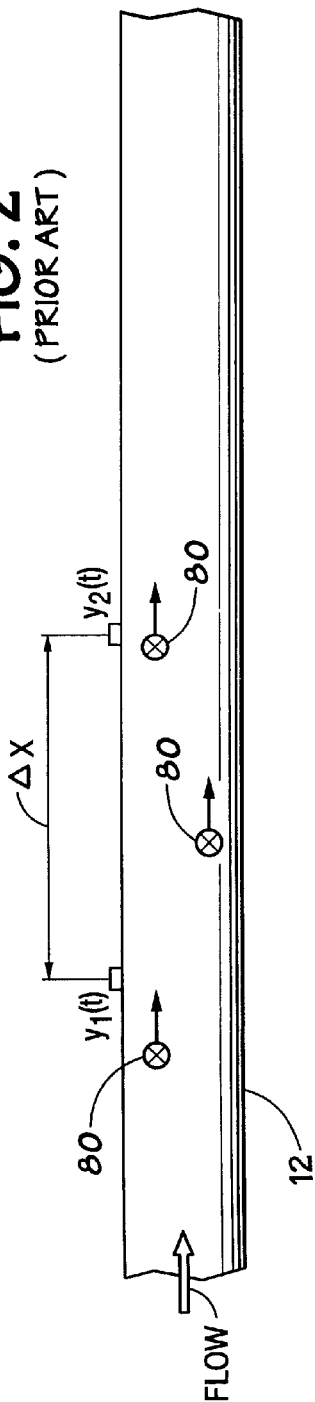
FIG. 2 is a side view of a pipe having two sensors that measure a parameter that convects with the flow in the pipe.
Figure 4:
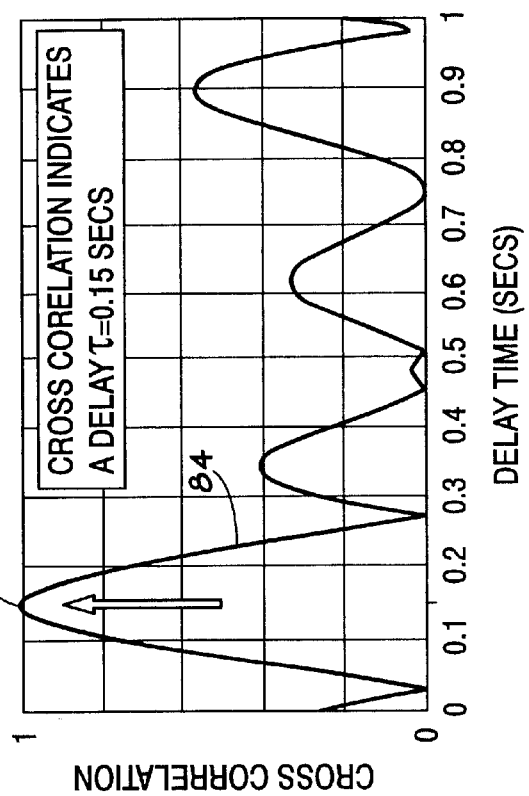
FIG. 4 is a graph of a cross-correlation between the two curves of FIG. 3.
Figure 3:
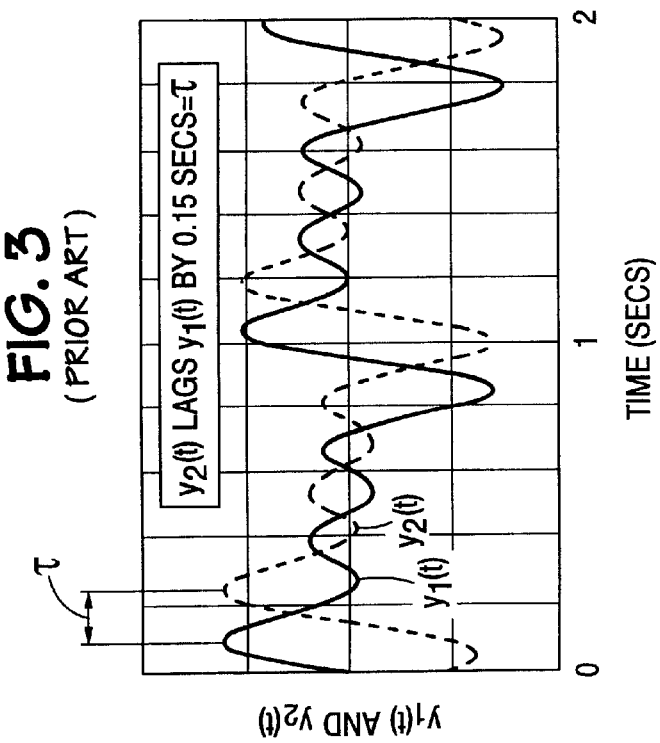
FIG. 3 is a graph of two curves, one from each of the two sensors of FIG. 2.

Referring to FIGS. 2, 3, 4, as is known, cross-correlation may be used to determine the time delay τ between two signals $y_1(t)$,$y_2(t)$ separated by a known distance ΔX, that are indicative of quantities 80 that convect with the flow (e.g., density perturbations, concentration perturbations, temperature perturbations, vortical pressure disturbances, and other quantities). In FIG. 3, the signal $y_2(t)$ lags behind the signal $y_1(t)$ by 0.15 seconds. If a time domain cross-correlation is taken between the two signals $y_1(t)$,$y_2(t)$, the result is shown in FIG. 4 as a curve 84. The highest peak 86 of the curve 84 shows the best fit for the time lag τ between the two signals $y_1(t)$,$y_2(t)$ is at 0.15 seconds which matches the reference time delay shown in FIG. 3.

Referring to FIG. 1, as discussed above, since pressure disturbances associated within the flow field 15 convect (or flow) at or near the average velocity of the fluid flowing in the pipe 12, the vortical pressure disturbances observed at the downstream location 16 are substantially a time lagged version of the vortical pressure disturbances observed at the upstream location 14. However, the total pressure perturbations or disturbances in a pipe may be expressed as being comprised of vortical pressure disturbances ($P_{vortical}$), acoustic pressure disturbances ($P_{acoustic}$) and other types of pressure disturbances ($P_{other}$) as shown below expressed in terms of axial position along the pipe at any point in time:

$$P(x,t) = P_{vortical}(x,t) + P_{acoustic}(x,t) + P_{other}(x,t) \qquad \text{Eq. 2}$$

As a result, the unsteady pressure disturbances $P_{vortical}$ can be masked by the acoustic pressure disturbances $P_{acoustic}$ and the other types of pressure disturbances $P_{other}$. In particular, the presence of the acoustic pressure disturbances that propagate both upstream and downstream at the speed of sound in the fluid (sonic velocity), can prohibit the direct measurement of velocity from cross-correlation of direct vortical pressure measurements.

The present invention uses temporal and spatial filtering to precondition the pressure signals to effectively filter out the acoustic pressure disturbances $P_{acoustic}$ and other long wavelength (compared to the sensor spacing) pressure disturbances in the pipe 12 at the two sensing regions 14,16, while retaining a substantial portion of the vortical pressure disturbances $P_{vortical}$ associated with the flow field 15 and any other short wavelength (compared to the sensor spacing) low frequency pressure disturbances $P_{other}$. In accordance with the present invention, if the low frequency pressure disturbances $P_{other}$ are small, they will not substantially impair the measurement accuracy of $P_{vortical}$.

The $P_{vortical}$ dominated signals from the two regions 14,16 are then cross-correlated to determine the time delay T between the two sensing locations 14,16, as discussed above. More specifically, at the sensing region 14, the difference between the two pressure sensors 18,20 creates a spatial filter 33 that effectively filters out (or attenuates) acoustic disturbances for which the wavelength $\lambda$ of the acoustic waves propagating along the fluid is long (e.g., ten-to-one) compared to the spacing $X_1$ between the sensors. Other wavelength to sensor spacing ratios may be used to effectuate filtering, provided the wavelength to sensor spacing ratio is sufficient to satisfy the two-to-one spatial aliasing Nyquist criteria, as is well known in the art and therefore not further described herein.

Thus, if the pressure sensors $P_1, P_2$ have an axial spacing $X_1$, and assuming that the spatial filter 33 will attenuate acoustic wavelengths longer than about 10 times the sensor spacing $X_1$, the smallest acoustic wavelength $\lambda$min that is attenuated would be:

$$\lambda_{min} = 10(X_1) \qquad \text{Eq. 3}$$

One-dimensional acoustic disturbances are governed by the following known inverse wavelength-frequency relation:

$$\lambda = a/f \text{ or } f = a/\lambda \qquad \text{Eq. 4}$$

where a is the speed of sound of the fluid, f is the frequency of the acoustic disturbance, and $\lambda$ is the wavelength of the acoustic disturbance. Using Eq. 4, such a spatial filter would filter out frequencies below about:

$$f_{max} = a/\lambda_{min} \qquad \text{Eq. 5}$$

For example, using water (a=5,000 ft/sec) with a sensor spacing of $X_1$=3 inches, the above described spatial acoustic filtering would filter out acoustic frequencies up to a maximum frequency of about 2000 Hz (or 5,000*12/30). Thus, the acoustic frequency content of the output signal $P_{as1}$ of the spatial filter 33 will be effectively removed for frequencies below about 2000 Hz and wavelengths above 30 inches (using Eq. 3). (The above discussion also applies to the second spatial filter 35.)

Figure 5:
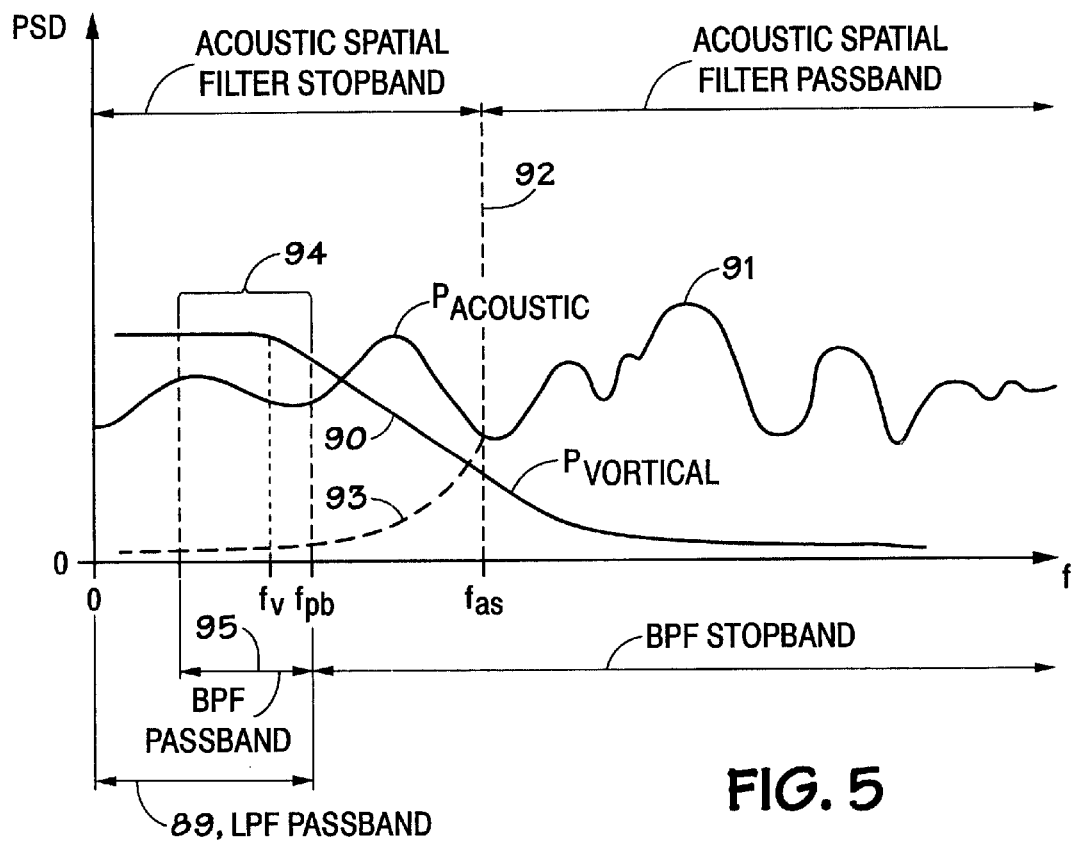
FIG. 5 is a graph of power spectral density plotted against frequency for an unsteady acoustic pressure signal $P_{acoustic}$ and unsteady vortical pressure signal $P_{vortical}$.

Referring to FIG. 5, relevant features of the power spectral density (PSD) of typical vortical pressure disturbances $P_{vortical}$ is shown by a curve 90 that has a flat region (or bandwidth) up to a frequency $f_v$ and then decreases with increasing frequency f. The value of $f_v$ is approximately equal to U/r, where U is the flow rate and r is the radius of the pipe. For example, for a flow rate U of about 10 ft/sec and a pipe radius r of about 0.125 ft (or about 1.5 inches), the bandwidth $f_v$ of the vortical pressure disturbances $P_{vortical}$ would be about 80 Hz (10/0.125). The PSD of the acoustic pressure disturbances $P_{acoustic}$ has a profile that is determined by the environment and other factors and is indicated in the figure by an arbitrary curve 91, and typically has both low and high frequency components.

Figure 6:
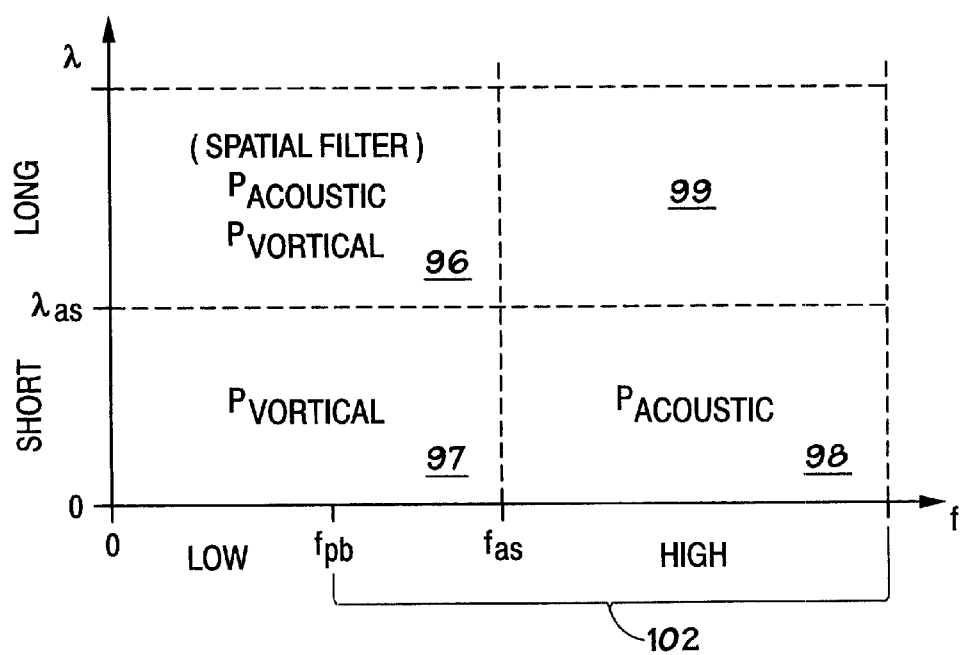
FIG. 6 is a graph of wavelength versus frequency for unsteady acoustic pressures $P_{acoustic}$ and unsteady vortical pressures $P_{vortical}$.

Referring to FIG. 6, in general, the acoustic pressure disturbances $P_{acoustic}$ have an inverse wavelength-frequency relationship as shown in Eq. 4, which has long wavelengths at low frequencies and short wavelengths at high frequencies as indicated by the regions 96,98, respectively. Conversely, the vortical pressure disturbances $P_{vortical}$ have both long and short wavelengths as indicated by the regions 96,97, respectively; however, they exist primarily at low frequencies (as discussed above with reference to FIG. 5). Thus, both $P_{acoustic}$ and $P_{vortical}$ exist in the long wavelength, low frequency region 96, and only $P_{vortical}$ exists in the short wavelength low frequency region 97.

The acoustic spatial filters 33,35 (FIG. 1) discussed above block or attenuate wavelengths longer than $\lambda_{as}$ and frequencies below $f_{as}$, as indicated by the region 96. Also, the bandpass filters (BPF) 46,56 (FIG. 1) block or attenuate high frequencies above $f_{pb}$ having short and long wavelengths as indicated by a region 102 and pass frequencies below $f_{as}$ where the $P_{vortical}$ signals exist. Thus, after the spatial filters 33,35 and the BPF's 46,56, the resultant filtered signals $P_{asf1}, P_{asf2}$ on the lines 48,58 (FIG. 1) will be dominated by the short wavelength unsteady pressure disturbances $P_{vortical}$ as indicated by the region 97 (FIG. 6) at frequencies below $f_{pb}$ and as indicated by a portion 94 of the curve 90 in the BPF passband 95 (FIG. 5).

Accordingly, referring to FIG. 5, the spatial filters 33,35 (FIG. 1) block the long wavelengths, which, for the acoustic pressure disturbances $P_{acoustic}$, occur at low frequencies as indicated to the left of a dashed line 92 at frequencies below the frequency $f_{as}$. A dashed line 93 indicates the attenuation of the acoustic pressure $P_{acoustic}$ signal 91 below the frequency $f_{as}$ at the output of the spatial filters. The vortical pressure disturbances $P_{vortical}$ are substantially not attenuated (or only slightly attenuated) because $P_{vortical}$ has short wavelengths at low frequencies that are substantially passed by the spatial filter. The BPF's 46,56 (FIG. 1) block or attenuate frequencies outside the passband indicated by a range of frequencies 95, and passes the unsteady pressure disturbances associated with stochastic flow fields 15 (FIG. 1) within the passband 95.

Alternatively, instead of the filters 46,56 being bandpass filters, provided the dc content is acceptably small, the filters 46,56 may comprise low pass filters, having a bandwidth similar to the upper band of the high pass filters discussed above. If a low pass filter is used as the filters 46,56, the passband is shown as a range of frequencies 89. It should be understood that the filters 46,56 are not required for the present invention if the PSD of the acoustic pressure disturbances $P_{acoustic}$ has substantially no or low PSD energy content in frequencies above the stopband of the spatial filter, which could adversely affect measurement accuracy.

Figure 7:
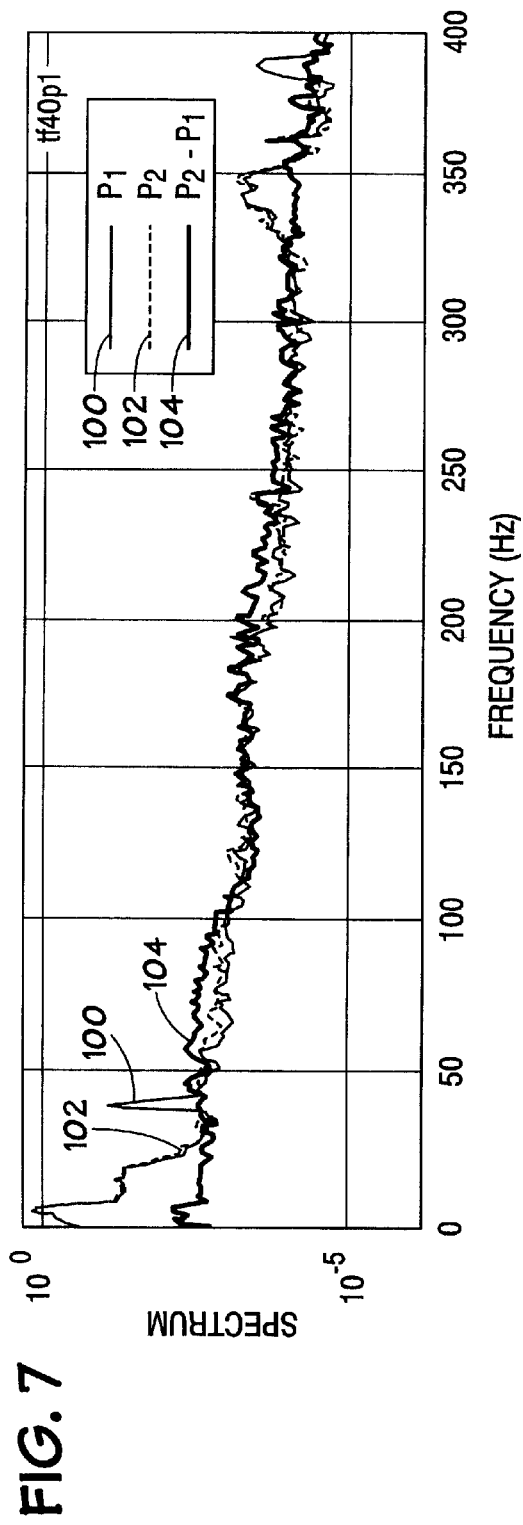
FIG. 7 is a graph of power spectrum of two unsteady pressures and the difference between the two pressures.

Referring to FIGS. 7 and 1, for the four ac pressure sensors 18,20,22,24 evenly axially spaced at 1 inch apart ($X_1$, $X_2$) along the pipe 12, and providing ac pressure signals $P_1, P_2, P_3, P_4$, respectively, the frequency power spectrum for $P_1$ and $P_2$ are shown by curves 100,102, respectively, for water flowing in an horizontal flow loop at a velocity of 11.2 ft/sec in a 2 inch diameter schedule 80 pipe using conventional piezoelectric ac pressure transducers. The power spectra of the curves 100,102 are nearly identical. The power spectrum of the difference $P_{as1}$ between the two signals $P_1, P_2$, shown by a curve 104 is reduced in certain frequency bands (e.g., 100–150 Hz) and increased in other frequency bands (e.g., 200–250 Hz) as compared to the individual signals 100,102.

Figure 8:
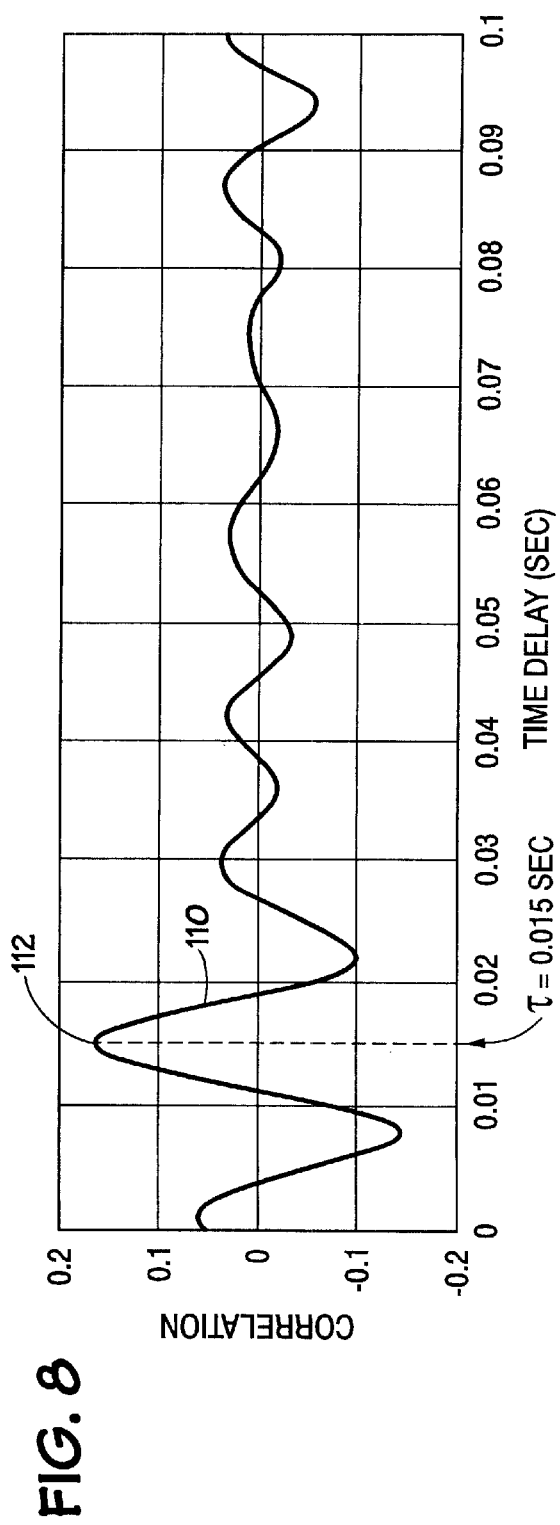
FIG. 8 is a graph of a cross-correlation between two of the curves of FIG. 7.

Referring to FIGS. 8 and 1, the cross correlation between the signals $P_{as1}$ (or $P_1 - P_2$) and $P_{as2}$ ($P_3 - P_4$) is shown as a curve 110. The highest peak 112 indicates the best fit for the time lag between the two signals $P_{as1}, P_{as2}$ as 0.015 seconds. Because the four sensors $P_1$ to $P_4$ were evenly axially spaced 1 inch apart, the effective distance $\Delta X$ between the sensor pairs is 2 inches. Thus, the velocity measured from Eq. 1 is 11.1 ft/sec (2/12/0.015) using the present invention, commensurate with the actual velocity of 11.2 ft/sec.

Figure 9:
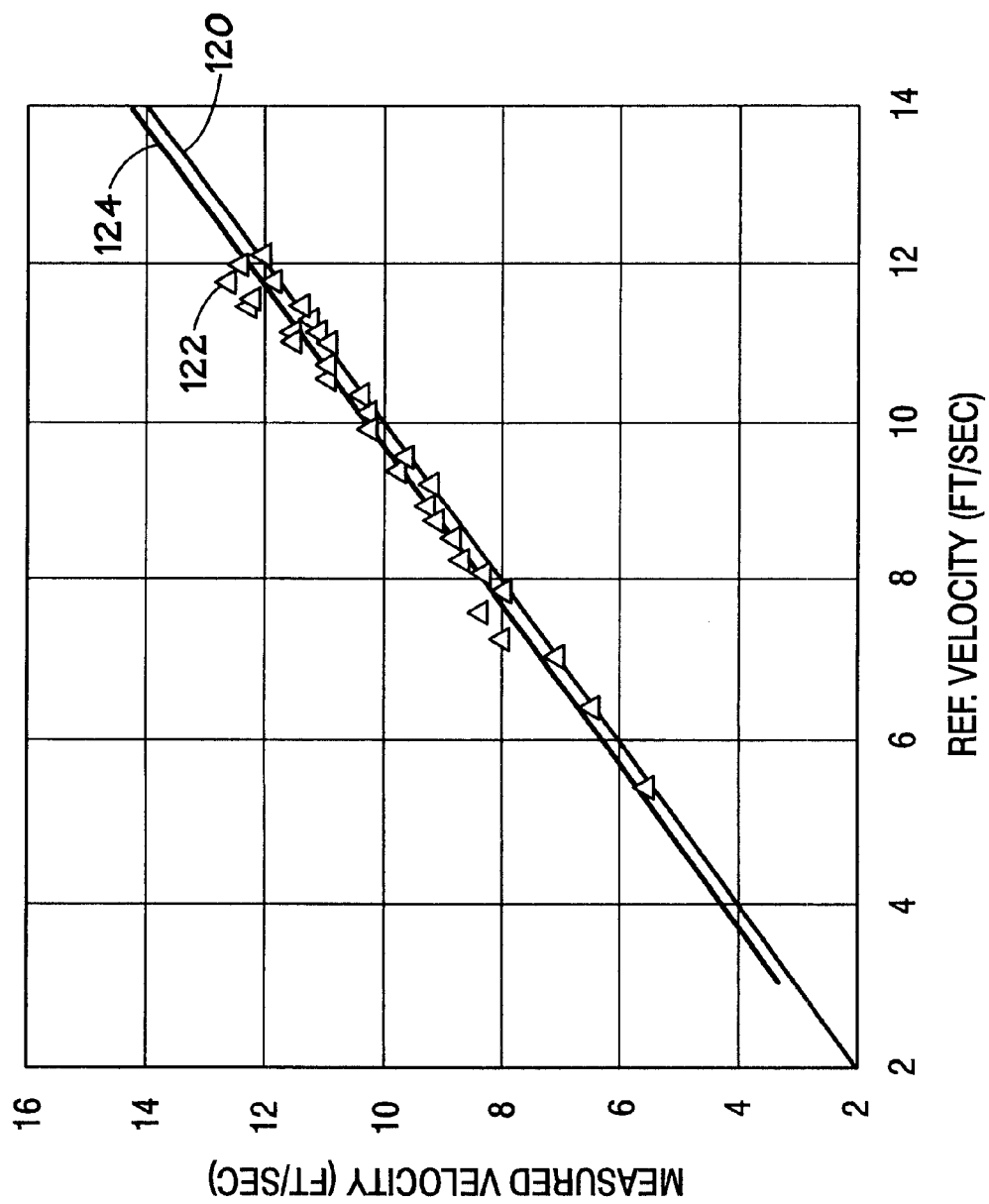
FIG. 9 is a graph of measured velocity against a reference velocity.

Referring to FIG. 9, for the configuration described with FIGS. 1, 7, 8 above, the velocity was measured at various flow rates and plotted against a reference velocity value. A solid line 120 shows the reference velocity, the triangles 122 are the measured data, and a line 124 is a curve fit of the data 122. This illustrates that the present invention predicts the flow velocity within a pipe (or conduit) with little error.

The pressure sensors 18,20,22,24 described herein may be any type of pressure sensor, capable of measuring the unsteady (or ac or dynamic) pressures within a pipe, such as piezoelectric, optical, capacitive, piezo-resistive (e.g., Wheatstone bridge), accelerometers, velocity measuring devices, displacement measuring devices, etc. If optical pressure sensors are used, the sensors 18–24 may be Bragg grating based pressure sensors, such as that described in copending U.S. patent application Ser. No. 08/925,598, entitled "High Sensitivity Fiber Optic Pressure Sensor For Use In Harsh Environments," filed Sep. 8, 1997. Alternatively, the sensors 18–24 may be electrical or optical strain gauges attached to or embedded in the outer or inner wall of the pipe which measure pipe wall strain, including microphones, hydrophones, or any other sensor capable of measuring the unsteady pressures within the pipe 12. In an embodiment of the present invention that utilizes fiber optics as the pressure sensors 18–24, they may be connected individually or may be multiplexed along one or more optical fibers using wavelength division multiplexing (WDM), time division multiplexing (TDM), or any other optical multiplexing techniques discussed further below.

Referring to FIG. 13, if a strain gauge is used as one or more of the pressure sensors 18–24 (FIGS. 14–20), it may measure the unsteady pressure variations $P_{in}$ inside the pipe 12 by measuring the elastic expansion and contraction (350) or torsion (351) of the pipe 12. In general, the strain gauges would measure the pipe wall deflection in any direction in response to unsteady pressure signals inside the pipe 12. The elastic expansion, contraction, or torsion of pipe 12 is measured at the location of the strain gauge as the internal pressure $P_{in}$ changes, thus measuring local strains such as axial strains, hoop strains, or off-axis strains. The variation in the circumference is determined by the hoop strength of the pipe 12, the internal pressure $P_{in}$, the external pressure $P_{out}$ outside the pipe 12, the thickness $T_w$ of the pipe wall 352, and the rigidity or modulus of the pipe material. Thus, the thickness of the pipe wall 352 and the pipe material in the sensor sections 14,16 (FIG. 1) may be set based on the desired sensitivity of filter 33 and other factors and may be different from the wall thickness or material of the pipe 12 outside the sensing regions 14,16.

Still with reference to FIG. 13 and FIG. 1, if an accelerometer is used as one or more of the pressure sensors 18–24, it may similarly measure the unsteady pressure variations $P_{in}$ inside the pipe 12 by measuring the acceleration of the surface of pipe 12 in a radial direction, as represented by arrows 350. The acceleration of the surface of pipe 12 is measured at the location of the accelerometer as the internal pressure $P_{in}$ changes and thus measures the local elastic dynamic radial response of the wall 352 of the pipe. The magnitude of the acceleration is variously determined by the hoop strength of the pipe 12, the internal pressure $P_{in}$, the external pressure $P_{out}$ outside the pipe 12, the thickness $T_w$ of the pipe wall 352, and the rigidity or modulus of the pipe material. Thus, the thickness of the pipe wall 352 and the pipe material in the sensor sections 14,16 (FIG. 1) may be set based on the desired sensitivity of filter 33 and other factors and may be different from the wall thickness or material of the pipe 12 outside the sensing region 14.

Alternatively, the pressure sensors 18–24 may comprise a radial velocity or displacement measurement device capable of measuring the radial displacement characteristics of wall 352 of pipe 12 in response to pressure changes caused by unsteady pressure signals in the pipe 12.

Referring to FIGS. 14, 15, 16, if an optical strain gauge is used, the ac pressure sensors 18–24 may be configured using an optical fiber 300 that is coiled or wrapped around and attached to the pipe 12 at each of the pressure sensor locations as indicated by the coils or wraps 302,304,306, 308, which detect pressures $P_1,P_2,P_3,P_4$ respectively. The fiber wraps 302–308 are wrapped around the pipe 12 such that the length of each of the fiber wraps 302–308 changes with changes in the pipe hoop strain caused by unsteady pressure variations within the pipe 12. Thus, internal pipe pressure is measured at the respective axial location. Such fiber length changes are measured using known optical measurement techniques as discussed below. Each of the wraps measures substantially the circumferentially averaged pressure within the pipe 12 at a corresponding axial location on the pipe 12. Also, the wraps provide axially averaged pressure over the axial length of a given wrap. While the structure of the pipe 12 provides some spatial filtering of short wavelength disturbances, it has been determined that the basic principle of operation of the invention remains substantially the same as that for the point sensors described above.

Referring to FIG. 14, for embodiments of the present invention where the wraps 302,304,306,308 are connected in series, pairs of Bragg gratings (310,312), (314,316), (318,320), (322,324) may be located along the fiber 300 at opposite ends of each of the wraps 302,304,306,308, respectively. The grating pairs are used to multiplex the pressure signals $P_1,P_2,P_3,P_4$ to identify the individual wraps from optical return signals. The first pair of gratings 310,312 around the wrap 302 may have a common reflection wavelength $\lambda_1$, and the second pair of gratings 314,316 around the wrap 304 may have a common reflection wavelength $\lambda_2$, but different from that of the first pair of gratings 310,312. Similarly, the third pair of gratings 318,320 around the wrap 306 may have a common reflection wavelength $\lambda_3$, which is different from $\lambda_1,\lambda_2$, and the fourth pair of gratings 322,324 around the wrap 308 may have a common reflection wavelength $\lambda_4$, which is different from $\lambda_1,\lambda_2,\lambda_3$.

Referring to FIG. 15, instead of having a different pair of reflection wavelengths associated with each wrap, a series of Bragg gratings 360–368 with only one grating between each of the wraps 302–308 may be used each having a common reflection wavelength $\lambda_1$.

Referring to FIGS. 14 and 15 the wraps 302–308 with the gratings 310–324 (FIG. 14) or with the gratings 360–368 (FIG. 15) may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn, and which is incorporated herein by reference in its entirety. One example of time-of-flight (or Time-Division-Multiplexing; TDM) would be where an optical pulse having a wavelength is launched down the fiber 300 and a series of optical pulses are reflected back along the fiber 300. The length of each wrap can then be determined by the time delay between each return pulse.

Alternatively, a portion or all of the fiber between the gratings (or including the gratings, or the entire fiber, if desired) may be doped with a rare earth dopant (such as erbium) to create a tunable fiber laser, such as is described in U.S. Pat. No. 5,317,576, entitled "Continuously Tunable Single Mode Rare-Earth Doped Laser Arrangement," U.S. Pat. No. 5,513,913, entitled "Active Multipoint Fiber Laser Sensor," or U.S. Pat. No. 5,564,832, entitled "Birefringent Active Fiber Laser Sensor," all issued to Ball et al., and which are incorporated herein by reference.

While the gratings 310–324 are shown oriented axially with respect to pipe 12, in FIGS. 14, 15, they may be oriented along the pipe 12 axially, circumferentially, or in any other orientations. Depending on the orientation, the grating may measure deformations in the pipe wall 352 with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 300.

Referring to FIG. 16, alternatively, the sensors 18–24 may also be formed as individual non-multiplexed interferometric sensors by wrapping the pipe 12 with the wraps 302–308 without using Bragg gratings. In this embodiment, separate fibers 330,332,334,336 are coupled to the separate wraps 302,304,306,308 respectively. In this particular embodiment, known interferometric techniques may be used to determine the length or change in length of the fiber 10 around the pipe 12 due to pressure changes, such as Mach Zehnder or Michaelson Interferometric techniques, which are described in U.S. Pat. No. 5,218,197, entitled "Method and Apparatus for the Non-invasive Measurement of Pressure Inside Pipes Using a Fiber Optic Interferometer Sensor," to Carroll, and which is herein incorporated by reference in its entirety.

A plurality of the sensors 10 of the present invention may be connected to a common cable and multiplexed together using any known multiplexing technique. The interferometric wraps may be multiplexed such as is described in Dandridge et al., "Fiber Optic Sensors for Navy Applications," IEEE, February 1991, or Dandridge et al., "Multiplexed Interferometric Fiber Sensor Arrays," SPIE, Vol. 1586, 1991, pp. 176–183, which are both herein incorporated by reference in their entireties. Other techniques to determine the change in fiber length may be used. Also, reference optical coils (not shown) may be used for certain interferometric approaches and may also be located on or around the pipe 12 which may be designed to be insensitive to pressure variations.

Referring to FIGS. 17 and 18, instead of the wraps 302–308 being optical fiber coils wrapped completely around the pipe 12, the wraps 302–308 may have alternative geometries, such as a "radiator coil" geometry (FIG. 17) or a "race-track" geometry (FIG. 18), which are shown in a side view as if the pipe 12 is cut axially and laid flat. In this particular embodiment, the wraps 302–208 are not necessarily wrapped 360 degrees around the pipe, but may be disposed over a predetermined portion of the circumference of the pipe 12, and have a length long enough to optically detect the changes to the pipe circumference. Other geometries for the wraps may be used if desired. Also, for any geometry of the wraps described herein, more than one layer of fiber may be used depending on the overall fiber length desired. The desired axial length of any particular wrap is set depending on the characteristics of the ac pressure desired to be measured, for example the axial length of the pressure disturbance caused by a vortex to be measured.

Referring to FIGS. 19 and 20, embodiments of the present invention include configurations wherein instead of using the wraps 302–308, the fiber 300 may have shorter sections that are disposed around at least a portion of the circumference of the pipe 12 that can optically detect changes to the pipe circumference. It is further within the scope of the present invention that sensors may comprise an optical fiber 300 disposed in a helical pattern (not shown) about pipe 12. As discussed herein above, the orientation of the strain sensing element will vary the sensitivity to deflections in pipe wall 352 caused by unsteady pressure transients in the pipe 12.

Referring to FIG. 19, in particular, the pairs of Bragg gratings (310,312), (314,316), (318,320), (322,324) are located along the fiber 300 with sections 380–386 of the fiber 300 between each of the grating pairs, respectively. In that case, known Fabry Perot, interferometric, time-of-flight or fiber laser sensing techniques may be used to measure the strain in the pipe, in a manner similar to that described in the aforementioned references.

Referring to FIG. 20, alternatively, individual gratings 370–376 may be disposed on the pipe and used to sense the unsteady variations in strain in the pipe 12 at the sensing locations in response to unsteady pressures within the pipe. When a single grating is used per sensor, the grating reflection wavelength shift will be indicative of changes in pipe diameter and thus pressure.

Any other technique or configuration for an optical strain gauge may be used. The type of optical strain gauge technique and optical signal analysis approach is not critical to the present invention, and the scope of the invention is not intended to be limited to any particular technique or approach.

For any of the embodiments described herein, the pressure sensors, including electrical strain gauges, optical fibers and/or gratings among others as described herein, may be attached to the pipe by adhesive, glue, epoxy, tape, or other suitable attachment means to ensure suitable contact between the sensor and the pipe 12. The sensors may alternatively be removable or permanently attached via known mechanical techniques such as by mechanical fastener, by spring loaded, by clamping, by a clamshell arrangement, by strapping, or by other equivalents. Alternatively, the strain gauges, including optical fibers and/or gratings, may be embedded in a composite pipe. If desired, for certain applications, the gratings may be detached or isolated from the pipe 12 if desired.

Figure 34A:
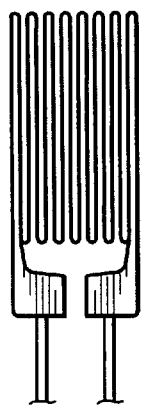
FIG. 34 is a plan view of alternate geometries for electronic strain gauges.
Figure 34B:
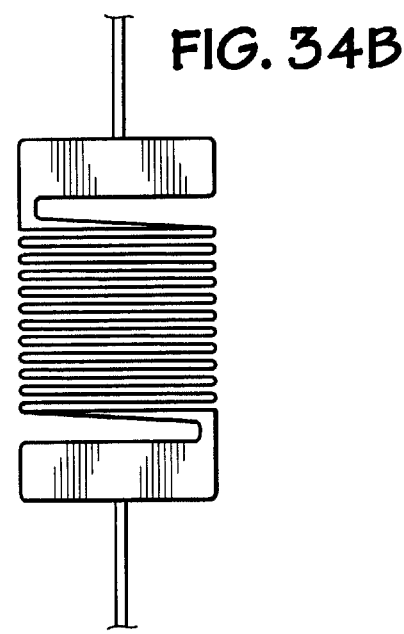
Figure 34C:
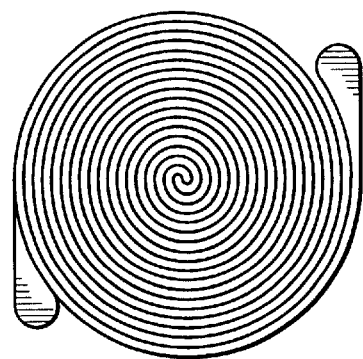
Figure 35:
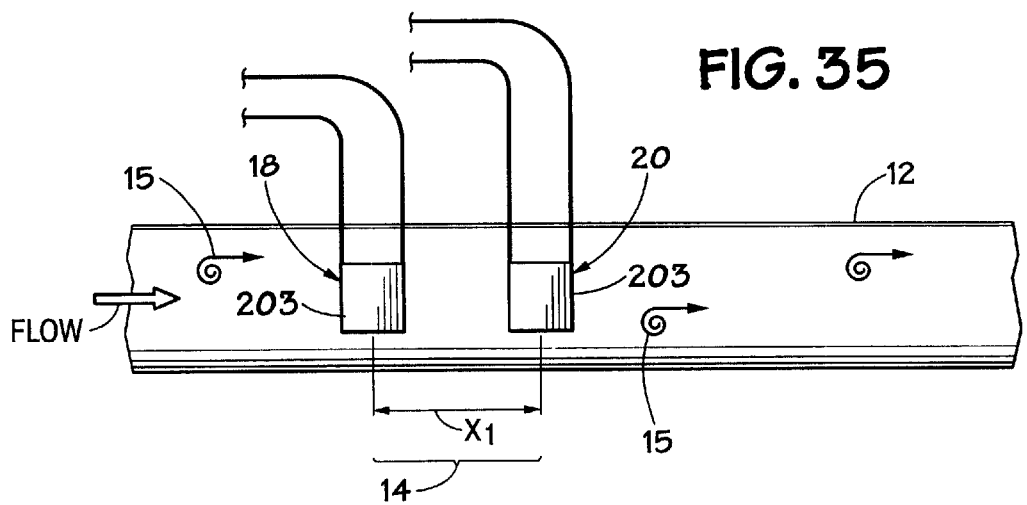
FIG. 35 is a side view of a pipe having a spatial filter disposed thereon comprised of electronic strain gauges.

It is also within the scope of the present invention that any other strain sensing technique may be used to measure the variations in strain in the pipe, such as highly sensitive piezoresistive, electronic, or electric strain gauges attached to or embedded in the pipe 12. Referring to FIG. 34, different known configurations of highly sensitive piezoresistive strain gauges are shown and may comprise foil type gauges. Referring to FIG. 35, an embodiment of the present invention is shown wherein pressure sensors 18, 20, comprise strain gauges 203. In this particular embodiment, strain gauges 203 are disposed about a predetermined portion of the circumference of pipe 12. The axial placement of and separation distance $X_1$ between pressure sensors 18, 20 are determined as described hereinabove. In particular, the placement is dependent upon the characteristics of the ac pressure desired to be measured, for example the spatial (axial or transverse) length and coherence length of the pressure disturbance caused by vortices, or other unsteady pressure disturbances, to be measured.

Any other technique or configuration for an optical strain gauge may be used. The type of optical strain gauge technique and optical signal analysis approach is not critical to the present invention, and the scope of the invention is not intended to be limited to any particular technique or approach.

Figure 10:
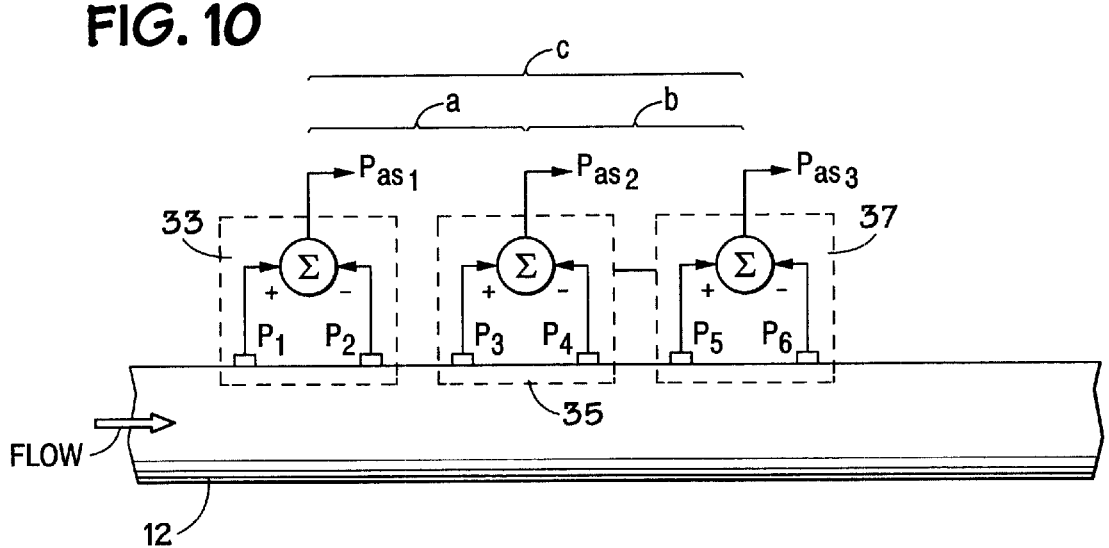
FIG. 10 is a side view of a pipe having three pairs of unsteady pressure sensors spaced axially along the pipe.

Referring to FIG. 10, there is shown an embodiment of the present invention comprising three spatial filters, 33,35,37 each comprising a pair of pressure sensors measuring at total of six unsteady pressures $P_1$–$P_6$ (three pairs), each pressure sensor being a plurality (e.g., 10 meters) of fiber optic wraps and the sensors being evenly axially spaced at 1.8 inches apart. The pipe has an inner diameter of 3.0 inches, a wall thickness of 0.22 inches, and made of J55 steel production tubing. The three spatial filters, 33,35,37 provide spatially filtered ac pressure signals $P_{as1}$, $P_{as2}$, $P_{as3}$, respectively.

These ac pressure signals $P_{sa1}$, $P_{as2}$, $P_{as3}$ may be used as input to a variety of devices. It is within the scope of the present invention that any number of spatial filters and spatial time filters may be used and that the particular embodiment will dictate the quantity and the spacing (not shown in FIG. 10) between each spatial filter. It is noted that although pressure sensors $P_1$–$P_6$ are shown as point sensors it is within the scope of the present invention that the sensors comprise any configuration capable of accurately detecting pressure changes in pipe 12 including fiber optic wraps as described herein.

Figure 11:
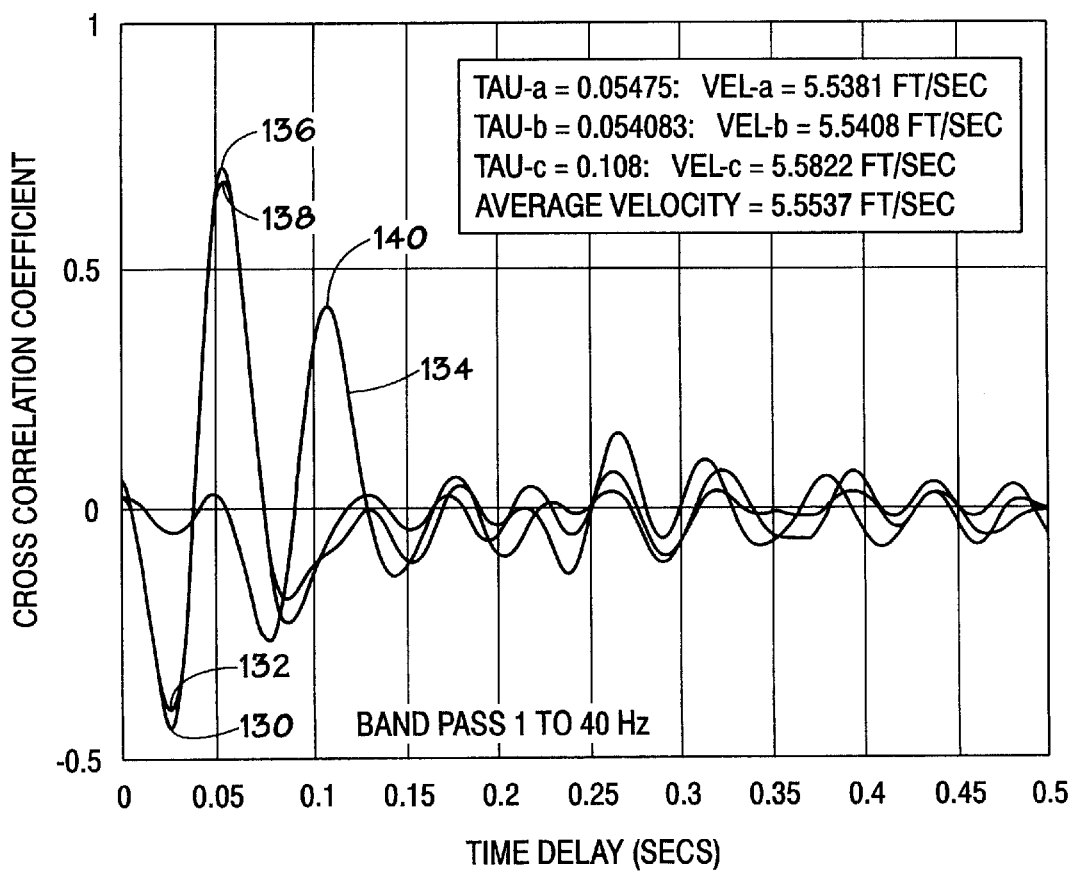
FIG. 11 is a graph of a cross correlation coefficient versus time delay for the three pairs of sensors of FIG. 10.

Referring to FIG. 11, for the configuration of FIG. 10, and for a liquid flow mixture of 100% oil at 111.2 gal/minute (or about 5.05 ft/sec for a 3-inch pipe), the invention provides cross-correlation curves 130,132,134. The curves 130,132, 134 correspond to velocities of 5.538 ft/sec, 5.541 ft/sec, 5.5822 ft/sec, for the cross-correlation between $P_{as1}$ and $P_{as2}$ (vel-a), $P_{as2}$ and $P_{as3}$ (vel-b), and $P_{as1}$ and $P_{as3}$ (vel-c), for the groups of sensors a,b,c, respectively, shown in FIG. 10. These values can then be used to determine an average velocity of 5.554 ft/sec for the fluid flowing in the pipe.

Figure 12:
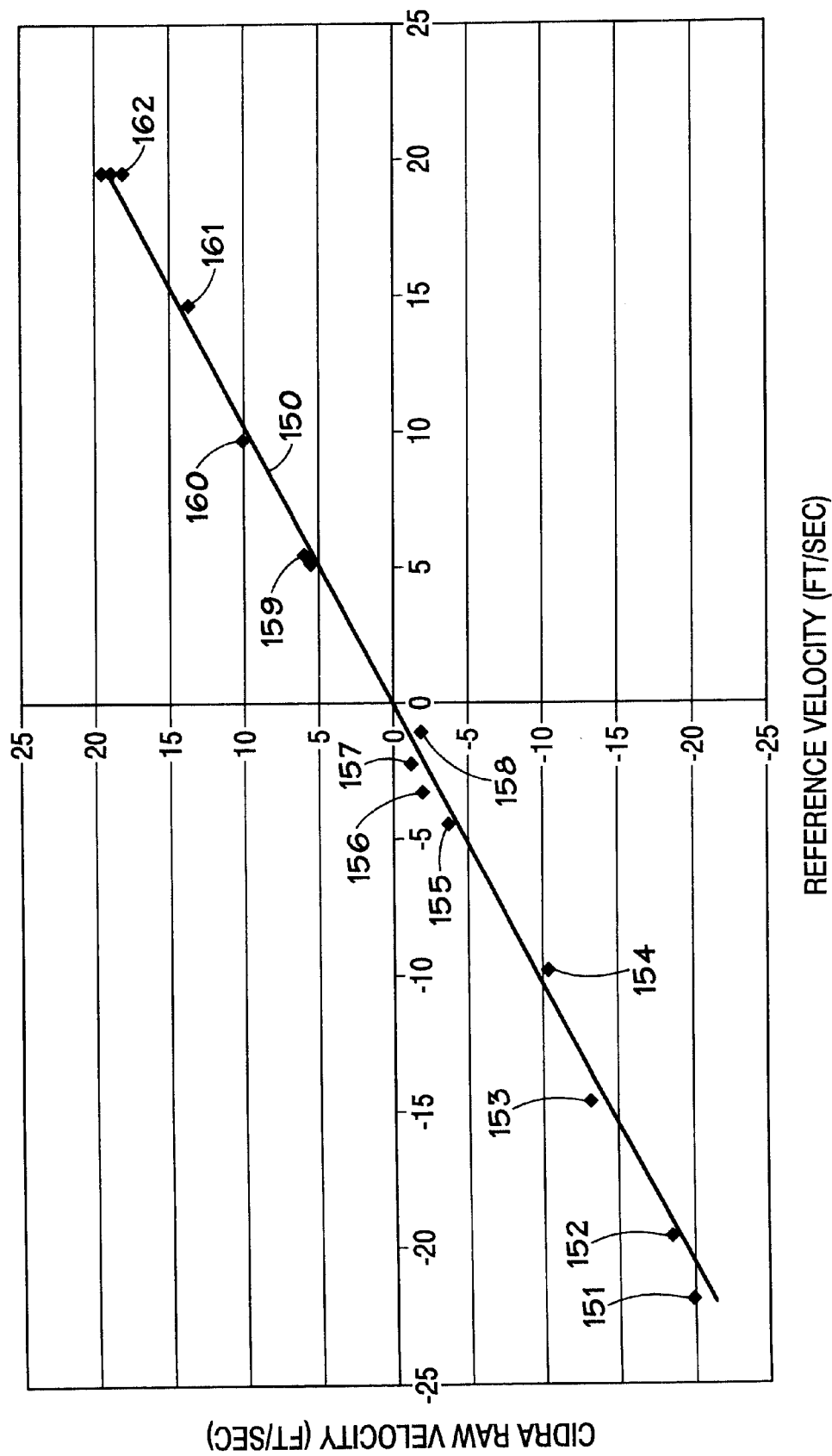
FIG. 12 is a graph of measured flow rate against a reference flow rate for various different mixtures.

Referring to FIG. 12, it is shown that the present invention will work over a wide range of oil/water mixtures. In particular, the first two pairs of sensors ($P_1$,$P_2$, and $P_3$,$P_4$) of FIG. 10 were used to measure the velocity at various flow rates against a reference velocity value. Data points 151–162 are groupings of measured velocity data points derived from the sensors ($P_1$,$P_2$,$P_3$,$P_4$) and are plotted against a reference velocity line 150. The data points 151–162 also show the invention will work for fluid flowing in either direction in the pipe 12. The negative flow data points 151–158 were taken with a fluid of 100% oil and the positive flow data points 159–162 were taken over a range of various oil/water mixtures. Specifically, data points 159 represent 100 individual data points taken at velocities from about 5.2 ft/sec to about 5.7 ft/sec and in oil/water mixtures from 0% to 100% water. Data point 160 represents a single individual data point taken at a velocity of about 9.9 ft/sec in an oil/water mixture of 0% water. Data point 161 represents a single individual data point taken at velocity of about 13.7 ft/sec in an oil/water mixture of 0% water. Similarly, data points 162 represent 21 individual data points taken at velocities from about 18.0 ft/sec to about 19.0 ft/sec and in oil/water mixtures from 0% to 100% water. The departure of the raw data 151–162 from the reference velocity line 150 is caused, in part, by the fact that the points were not calibrated and that the reference velocity at each point was taken manually by a technician. Had the data points been calibrated and electronically matched to the sensed points the departure from the reference line 150 would not have been as large as depicted in the figure.

The present invention will also work over a wide range of oil/water/gas mixtures. Also, the invention will work for very low flow velocities, e.g., at or below 1 ft/sec (or about 20.03 gal/min, in a 3-inch diameter pipe) and has no practical maximum flow rate limit. Further, the invention will work with the pipe 12 being oriented vertically, horizontally, or in any other orientation. Also the invention will work equally well independent of the direction of the flow along the pipe 12.

Although the pressure sensors have generally been shown in the figures as an array of axially spaced pressure sensors, it is within the scope of the present invention that the pressure sensors are circumferentially and variously combined with axially spaced sensors. Referring to FIG. 21, instead of the pressure sensors 18,20 and the corresponding pressure signals $P_1$,$P_2$ being spaced axially along the pipe 12, the sensors 18,20 may be spaced circumferentially apart at substantially the same axial location. In this case, the spatial filter (see element 33, FIG. 1) filters out substantially all one-dimensional acoustic waves propagating through the sensing region 14.

Alternatively, referring to FIGS. 22 and 23, instead of the pressure sensors 18,20 being located directly across from each other, the signal $P_2$ may be measured at a distance circumferentially closer to the sensor 18, as indicated by a sensor 200. The circumferential distance 53 between the two sensors 18,200 should be large enough to independently measure a propagating vortical pressure field 15 such that the spatial filter 33 output is not zero for the measured vortex 15, i.e., such that the circumferential distance 53 is greater than the transverse spatial length of vortex 15.

The distance $X_1$ should be less than or equal to the axial coherence length of the vortex 15 such that the spatial filter output is indicative of a measured vortex 15. For optimal performance, the distance $X_1$ between the two sensors 18,20 should be larger than the spatial (axial or transverse) length of the vortical pressure field 15 such that each of the sensors 18,20 can independently measure the propagating vortical pressure field 15 between the sensors 18,20 at different times (such that the spatial filter 33 output is not zero for the measured vortex 15). For further optimal performance, the overall length $L_1$ between the first sensor 18 and the last sensor 24 of the velocity sensing section should be within the coherence length of the vortices 15 desired to be measured. The coherence length of the vortical flow field 15 is the length over which the vortical flow field remains substantially coherent, which is related to and scales with the diameter of the pipe 12. Additionally, the thickness and rigidity of the outer wall of the pipe 12 relates to the acceptable spacing $X_1$ (FIG. 1) between the sensors 18,20 of the spatial filter 33, because a thinner or less rigid the pipe 12 wall permits the sensors 18,20 to be closer to each other.

Vortices that are sensed by only one of the spatial filters, because either a vortex is generated between the spatial filters or generated outside the spatial filters and decay between them, will be substantially random events (in time and location) that will not be correlated to the vortices that are sensed by and continuously occurring past both spatial filters and, as such, will not significantly affect the accuracy of the measurement.

Figure 24:
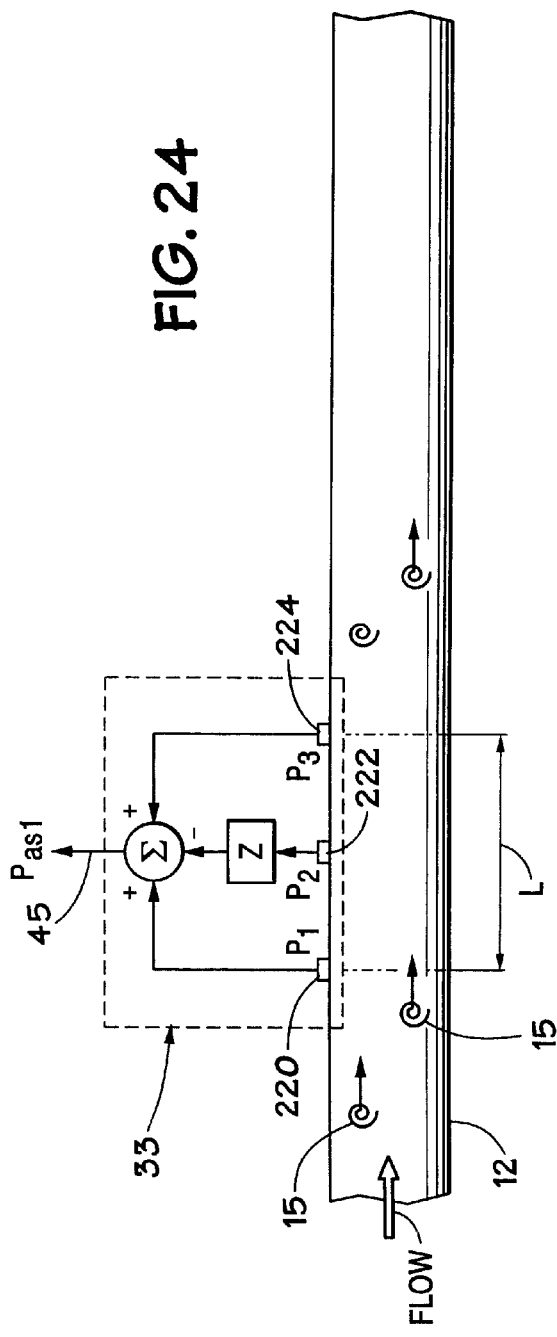
FIG. 24 is a side view of a pipe having a set of three pressure sensors that form a spatial filter.

Referring to FIG. 24, a particular embodiment of the present invention is shown in which more than two sensors may be used for one or both of the spatial filters 33,35. In particular, the summer 44 may have three inputs $P_1$,$P_2$,$P_3$, from three pressure sensors 220,222,224 where the output signal $P_{sa1}$=$P_1$−$2P_2$+$P_3$. For optimal performance, the overall axial length L of the filter 33 should be within the coherence length of the vortices 15 being measured, and the individual spacing between the sensors 220,222,224 should have the same criteria discussed above for the spacing between two sensors 18,20.

Figure 32:
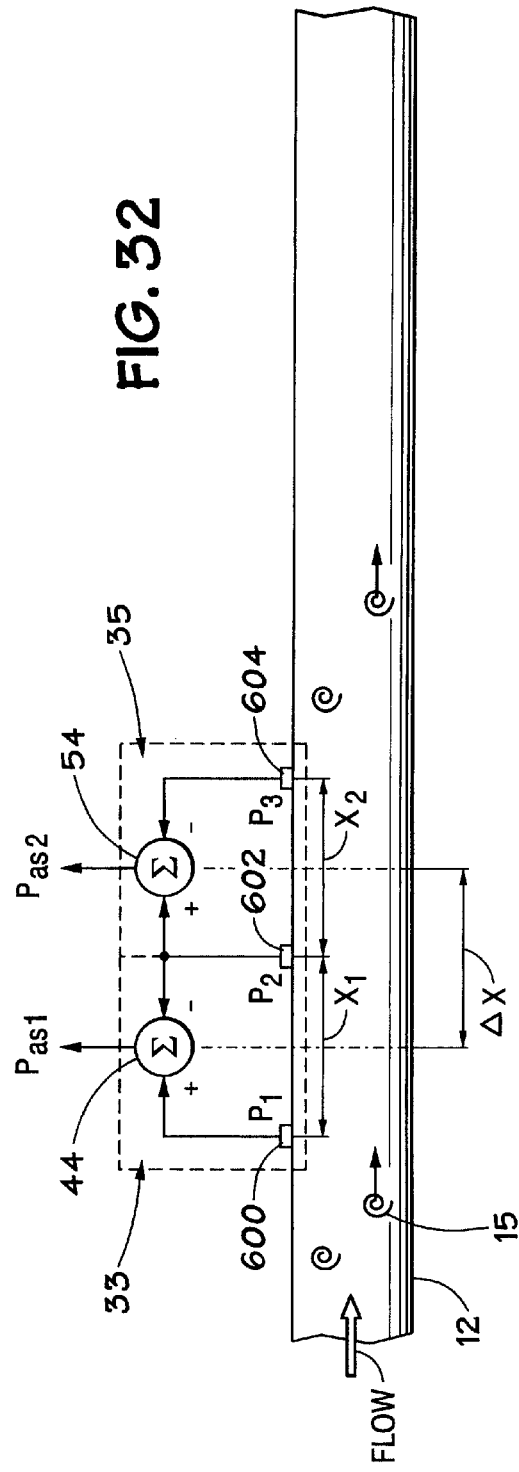
FIG. 32 is a side view of a pipe having a set of three pressure sensors that make up two spatial filters.

Referring to FIG. 32, instead of using four pressure sensors to make the spatial filters 33,35 three pressure sensors 600,602,604 may be used where the middle sensor 602 is used for both the spatial filters 33,35.

Referring to FIGS. 28–31, instead of measuring the unsteady pressures $P_1-P_4$ on the exterior of the pipe 12, the invention will also work when the unsteady pressures are measured inside the pipe 12. In particular, the pressure sensors 18,20 that measure the pressures $P_1,P_2$, may be located anywhere within the pipe 12, having the same constraints discussed above for the exterior measurements. Any technique may be used to measure the unsteady pressures inside the pipe 12.

Figure 25:
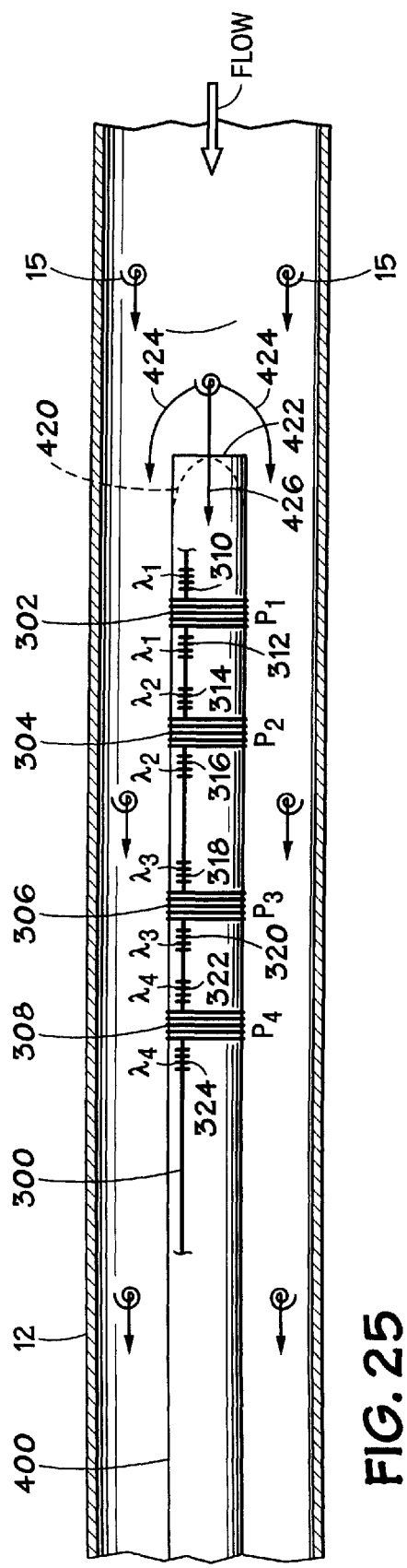
FIG. 25 is a side view of a pipe having an inner tube with axially distributed optical fiber wraps comprising unsteady pressure sensors.
Figure 26:
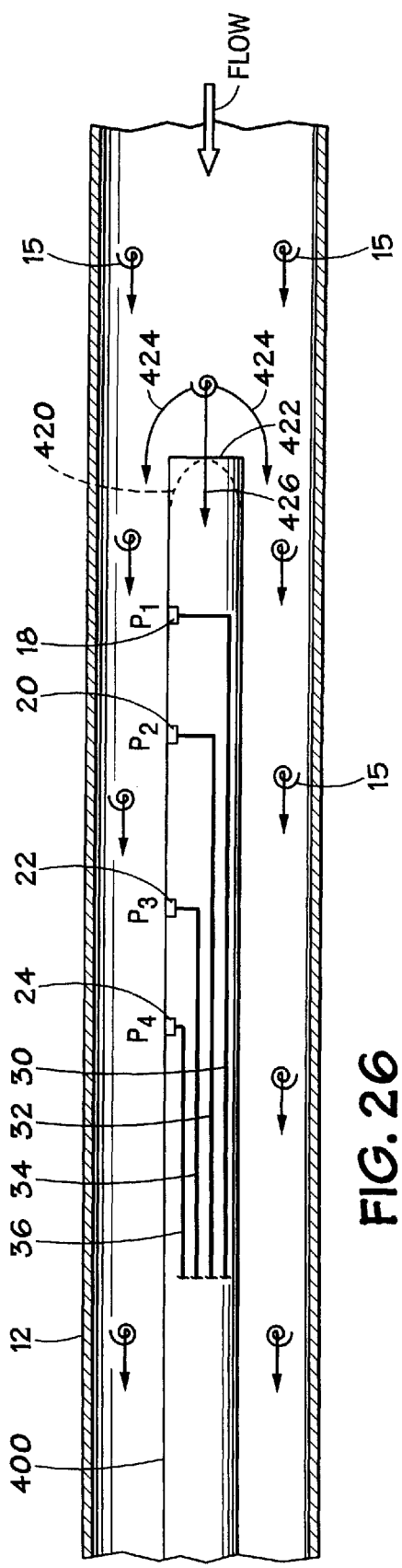
FIG. 26 is a side view of a pipe having an inner tube with axially distributed unsteady pressure sensors located along the tube.

Referring to FIGS. 25–27, the invention may also measure the velocity of flow outside a pipe or tube 400. In this case, the tube 400 may be placed within the pipe 12 and the pressures $P_1-P_4$ measured at the outside of the tube 400. Any technique may be used to measure the unsteady pressures $P_1-P_4$ outside the tube 400.

Referring to FIG. 25, for example, the tube 400 may have the optical wraps 302–308 wrapped around the tube 400 at each sensing location. Alternatively, any of the strain, displacement, velocity, or accelerometer sensors or techniques described herein may be used on the tube 400. Referring to FIG. 26, alternatively, the pressures $P_1-P_4$ may be measured using direct pressure measurement sensors or techniques described herein. Any other type of unsteady pressure sensors 18–24 may be used to measure the unsteady pressures within the pipe 12.

Alternatively, referring to FIG. 27, hydrophones 402–408 may be used to sense the unsteady pressures within the pipe 12. In that case, the hydrophones 402–408 may be located in the tube 400 for ease of deployment or for other reasons. The hydrophones 402–408 may be fiber optic, electronic, piezoelectric or other types of hydrophones. If fiber optic hydrophones are used, the hydrophones 402–408 may be connected in series or parallel along the common optical fiber 300.

The tube 400 may be made of any material that allows the unsteady pressure sensors to measure the pressures $P_1-P_4$ and may be hollow, solid, or gas filled or fluid filled. One example of a dynamic pressure sensor is described in co-pending commonly-owned U.S. Pat. No. 6,233,374, entitled "Mandrel Wound Fiber Optic Pressure Sensor," issued May 15, 2001, which is hereby incorporated by reference in its entirety. The end 422 of the tube 400 may be closed or open. If the end 422 is closed, the flow path would be around the end 422 as indicated by lines 424. If the end 422 is open, the flow path would be through the inside of the tube, as indicated by a line 426, and the pressure could then be measured inside of the pipe 12. For oil and gas well applications, the tube 400 may be coiled tubing having the pressure sensors for sensing $P_1-P_4$ inside the tubing 400.

Although the invention has been described with respect to the detection of certain types of unsteady flow fields and the pressure disturbances associated therewith, it should be understood that the invention will also detect any unsteady stochastic flow field and its associated pressure field that propagates within the flow, provided the spatial filters have a separation within the acceptable coherence length of the flow field to be measured and the sensor spacing within each spatial filter is longer than a characteristic spatial length of the disturbance. Some examples of such other stochastic flow fields are gas bubbles, gas slugs, particles, or chunks of material, which may travel in the flow at different rates than the mean flow velocity, thereby creating a traveling pressure disturbance exhibiting a velocity slip between it and the other constituents in the fluid or fluid mixture.

Accordingly, the invention may be used to detect such different flow rates within the same fluid or fluid mixture (e.g., the flow rate of an unsteady pressure field within the mixture). Also, such unsteady flow fields, when traveling at different rates from other portions of the fluid or fluid mixture, may also shed vortices in the flow that may propagate with the flow and be detected as an unsteady flow field by the present invention.

Figure 33:
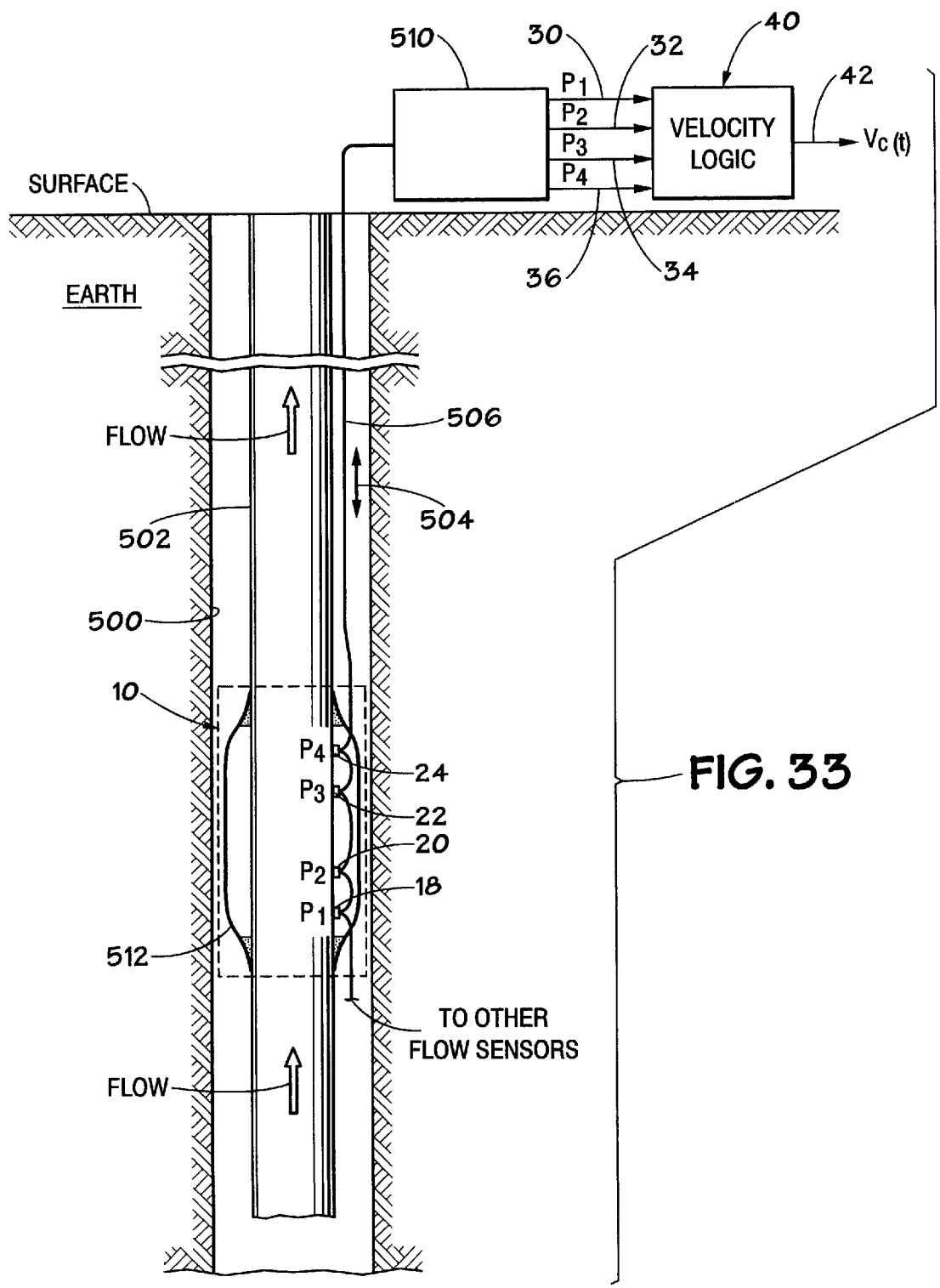
FIG. 33 is a schematic drawing of a flow meter in a well.

Referring to FIG. 33, there is shown an embodiment of the present invention in an oil or gas well application. The sensing section 10 may be connected to or part of production tubing 502 within a well 500. An outer housing, sheath, or cover 512 may be located over the sensors 18–24 and attached to the pipe to protect the sensors 18–24 (or fibers) from damage during deployment, use, or retrieval, and/or to help isolate the sensors from external pressure effects that may exist outside the production tubing 502, and/or to help isolate ac pressures in production tubing 502 from unsteady pressures outside the production tubing 502. The sensors 18–24 are connected to a cable 506, which may comprise optical fiber, and which is connected to a transceiver/converter 510 located outside the well.

When optical sensors are used, the transceiver/converter 510 may be used to receive and transmit optical signals to the sensors 18–24 and provides output signals indicative of the pressure $P_1-P_4$ at the sensors 18–24 on the lines 30–36, respectively. The transceiver/converter 510 may be part of the velocity logic 40. The transceiver/converter 510 may be any device that performs the corresponding functions described herein. In particular, the transceiver/converter 510 together with the optical sensors described above may use any type of optical grating-based measurement technique, e.g., scanning interferometric, scanning Fabry Perot, acousto-optic-tuned filter (AOTF), optical filter, time-of-flight, etc., having sufficient sensitivity to measure the unsteady pressures within the pipe. Such techniques are described in one or more of the following references: A. Kersey et al., "Multiplexed Fiber Bragg Grating Strain-Sensor System With a Fabry-Perot Wavelength Filter," Opt. Letters, Vol. 18, No. 16, August 1993; U.S. Pat. No. 5,493,390, issued Feb. 20, 1996 to Mauro Verasi et al.; U.S. Pat. No. 5,317,576, issued May 31, 1994 to Ball et al.; U.S. Pat. No. 5,564,832, issued Oct. 15, 1996 to Ball et al.; U.S. Pat. No. 5,513,913, issued May 7, 1996 to Ball et al.; U.S. Pat. No. 5,426,297, issued Jun. 20, 1995 to Dunphy et al.; U.S. Pat. No. 5,401,956, issued Mar. 28, 1995 to Dunphy et al.; U.S. Pat. No. 4,950,883, issued Aug. 21, 1990 to Glenn; and U.S. Pat. No. 4,996,419, issued Feb. 26, 1991 to Morey, all of which are hereby incorporated by reference in their entireties. Furthermore, the pressure sensors described herein may operate using one or more of the techniques described in the aforementioned references.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made without departing from the spirit and scope of the present invention.

What is claimed is:

1. An apparatus for measuring a velocity of a fluid moving in a pipe, the fluid containing inhomogenous pressure disturbances, comprising:

a first filter for measuring the inhomogenous pressure disturbances at a first axial location along the pipe and for providing a first pressure signal;

a second filter for measuring the inhomogenous pressure disturbances at a second axial location along the pipe and for providing a second pressure signal; and a logic processing system, responsive to the first and the second pressure signals, for providing a velocity signal indicative of the velocity of the fluid in the pipe.

2. The apparatus of claim 1, wherein the inhomogenous pressure disturbances are stochastic within the fluid.

3. The apparatus of claim 1, wherein the inhomogenous pressure disturbances are naturally occurring within the fluid.

4. The apparatus of claim 1, wherein the inhomogenous pressure disturbances comprise vortices.

5. The apparatus of claim 1, wherein the fluid comprises a fluid mixture.

6. The apparatus of claim 5, wherein the velocity signal relates to the velocity of a constituent in the fluid mixture.

7. The apparatus of claim 1, wherein the fluid mixture consists of any combination of oil, gas, or water.

8. The apparatus of claim 1, wherein the first and the second filters filter out wavelengths above a predetermined wavelength.

9. The apparatus of claim 8, wherein the first and the second filters filter out wavelengths associated with an acoustic pressure field.

10. The apparatus of claim 1, wherein the first and second filters are affixed to an outer surface of the pipe.

11. The apparatus of claim 1, wherein the first filter comprises at least a first and a second pressure sensor disposed a first distance apart from each other at the first axial location, and wherein the second filter comprises at least a third and a fourth pressure sensor disposed a second distance apart from each other at the second axial location.

12. The apparatus of claim 11, wherein the first and second distances comprise axial distances along the pipe.

13. The apparatus of claim 11, wherein the first and second distances comprise circumferential distances around the pipe.

14. The apparatus of claim 11, wherein at least one of the pressure sensors is disposed on a surface of the pipe.

15. The apparatus of claim 14, wherein the surface is an outer surface of the pipe.

16. The apparatus of claim 11, wherein at least one of the pressure sensors is in contact with the fluid in the pipe.

17. The apparatus of claim 16, wherein at least one of the pressure sensors is affixed to a structure inside the pipe.

18. The apparatus of claim 17, wherein the structure is cylindrical.

19. The apparatus of claim 18, wherein the pressure sensor is selected from the group consisting of a piezoelectric strain gauge, a capacitive strain gauge, piezoresistive strain gauge, an accelerometer, and a hydrophone.

20. The apparatus of claim 11, wherein at least one of the pressure sensors comprises a strain gauge.

21. The apparatus of claim 20, wherein the strain gauge is selected from the group consisting of a piezoelectric strain gauge, a capacitive strain gauge, piezoresistive strain gauge, and an accelerometer.

22. The apparatus or claim 11, wherein the strain gauge is a fiber optic strain gauge.

23. The apparatus or claim 22, wherein the fiber optic strain gauge comprises at least one Bragg grating.

24. The apparatus of claim 11, wherein at least one sensor is a fiber optic coil wrapped around the pipe.

25. The apparatus of claim 24, wherein the fiber optic coil is bounded by Bragg gratings.

26. The apparatus of claim 11, wherein the first, second, third and fourth pressure sensors are fiber optic sensors, and wherein the fiber optic sensors are multiplexed.

27. The apparatus of claim 11, wherein the first pressure sensors is coupled to a positive input of a summer, and wherein the second pressure sensor is coupled to a negative input of the summer.

28. The apparatus of claim 1, wherein the logic processing system comprises a cross-correlator, and wherein the first and second pressure signals are in communication with the cross-correlator, and wherein the cross-correlator computes a time delay between the first and second pressure signals.

29. The apparatus of claim 1, wherein the logic processing system comprises a third filter coupled to either the first or second pressure signal, and wherein the third filter filters out a predetermined range of wavelengths in the first or second pressure signal.

30. The apparatus of claim 29, wherein the third filter comprises a band pass filter.

31. The apparatus of claim 1, wherein the first and second filter share a common pressure sensor.

32. The apparatus of claim 1, wherein the pipe is a petroleum production pipe deployed in a well.

33. An apparatus for measuring a velocity of a fluid moving in a pipe, the fluid containing inhomogenous pressure disturbances, comprising:
a plurality of pressure sensors attached to the outside of the pipe for measuring the inhomogenous pressure disturbances at a plurality of axial locations along the pipe, each sensor providing a pressure signal;
a logic processing system, responsive to at least two of the plurality of pressure signals, for providing a velocity signal indicative of the velocity of the fluid in the pipe.

34. The apparatus of claim 33, wherein the inhomogenous pressure disturbances are stochastic within the fluid.

35. The apparatus of claim 33, wherein the inhomogenous pressure disturbances are naturally occurring within the fluid.

36. The apparatus of claim 33, wherein the inhomogenous pressure disturbances comprise vortices.

37. The apparatus of claim 33, wherein the fluid comprises a fluid mixture.

38. The apparatus of claim 37, wherein the velocity signal relates to the velocity of a constituent in the fluid mixture.

39. The apparatus of claim 33, wherein the fluid mixture consists of any combination of oil, gas, or water.

40. The apparatus of claim 33, wherein the plurality of sensors are configured to filter out wavelengths above a predetermined wavelength.

41. The apparatus of claim 33, wherein at least one of the pressure sensors comprises a strain gauge.

42. The apparatus of claim 41, wherein the strain gauge is a fiber optic strain gauge.

43. The apparatus of claim 42, wherein the fiber optic strain gauge comprises at least one Bragg grating.

44. The apparatus of claim 41, wherein the strain gauge is selected from the group consisting of a piezoelectric strain gauge, a capacitive strain gauge, piezoresistive strain gauge, and an accelerometer.

45. The apparatus of claim 33, wherein at least one pressure sensor is a fiber optic coil wrapped around the pipe.

46. The apparatus claim 45, wherein the fiber optic coil is bounded by Bragg gratings.

47. The apparatus of claim 33, wherein the plurality of pressure sensors are fiber optic sensors, and wherein the fiber optic sensors are multiplexed.

48. The apparatus of claim 33, wherein the logic processing system comprises a cross-correlator, and wherein the plurality of pressure signals are in communication with the cross-correlator, and wherein the cross-correlator computes a time delay between at least two of the plurality of pressure signals.

49. The apparatus of claim 33, wherein the pipe is a petroleum production pipe deployed in a well.

50. An apparatus for measuring a velocity of a fluid moving in a pipe, the fluid containing inhomogenous pressure disturbances, comprising:
- a first means for measuring the inhomogenous pressure disturbances at a first axial location along the ripe and for providing a first pressure signal;
- a second means for measuring the inhomogenous pressure disturbances at a second axial location alone the pipe and for providing a second pressure signal; and
- a logic processing system, responsive to the first and the second pressure signals, for providing a velocity signal indicative of the velocity of the fluid in the pipe.

51. The apparatus of claim 50, wherein the inhomogenous pressure disturbances are stochastic within the fluid.

52. The apparatus of claim 50, wherein the inhomogenous pressure disturbances are naturally occurring within the fluid.

53. The apparatus of claim 50, wherein the inhomogenous pressure disturbances comprise vortices.

54. The apparatus of claim 50, wherein the fluid comprises a fluid mixture.

55. The apparatus of claim 54, wherein the velocity signal relates to the velocity of a constituent in the fluid mixture.

56. The apparatus of claim 50, wherein the fluid mixture consists of any combination of oil, gas, or water.

57. The apparatus of claim 50, wherein the first and the second means filter out wavelengths above a predetermined wavelength.

58. The apparatus of claim 50, wherein the first and second means are affixed to an outer surface of the pipe.

59. The apparatus of claim 50, wherein the first or second means comprises a pressure sensor selected from the group consisting of a piezoelectric strain gauge, a capacitive strain gauge, piezoresistive strain gauge, an accelerometer, and a hydrophone.

60. The apparatus of claim 50, wherein the first or second means comprises a fiber optic pressure sensor.

61. The apparatus of claim 60, wherein the fiber optic pressure sensor comprises at least one Bragg grating.

62. The apparatus of claim 60, wherein the fiber optic pressure sensor comprises a fiber optic coil wrapped around the pipe.

63. The apparatus claim 62, wherein the fiber optic coil is bounded by Bragg gratings.

64. The apparatus of claim 50, wherein the logic processing system comprises a cross-correlator, and wherein the first and second pressure signals are in communication with the cross-correlator, and wherein the cross-correlator computes a time delay between the first and second pressure signals.

65. The apparatus of claim 50, wherein the pipe is a petroleum production pipe deployed in a well.

66. A method for measuring a velocity of a fluid moving in a pipe, the fluid containing inhomogenous pressure disturbances, comprising:
- detecting the inhomogenous pressure disturbances at a first axial location along the pipe to provide a first pressure signal;
- detecting the inhomogenous pressure disturbances at a second axial location along the pipe to provide a second pressure signal; and
- processing the first and the second pressure signals to provide a velocity signal indicative of the velocity of the fluid in the pipe.

67. The method of claim 66, wherein the inhomogenous pressure disturbances are stochastic within the fluid.

68. The method of claim 66, wherein the inhomogenous pressure disturbances are naturally occurring within the fluid.

69. The method of claim 66, wherein the inhomogenous pressure disturbances comprise vortices.

70. The method of claim 66, wherein the fluid comprises a fluid mixture.

71. The method of claim 70, wherein the velocity signal relates to the velocity of a constituent in the fluid mixture.

72. The method of claim 66, wherein the fluid mixture consists of any combination of oil, gas, or water.

73. The method of claim 66, wherein the first and second pressure signals are filtered to filter out wavelengths above a predetermined wavelength.

74. The method of claim 66, wherein detecting the inhomogenous pressure disturbances at the first axial location comprises the use of a first filter, and wherein detecting the inhomogenous pressure disturbances at the second axial location comprises the use of a second filter.

75. The method of claim 74, further comprising affixing the first and second filters to an outer surface of the pipe.

76. The method of claim 74, wherein the first filter comprises at least a first and a second pressure sensor disposed a first distance apart from each other at the first axial location, and wherein the second filter comprises at least a third and a fourth pressure sensors disposed a second distance apart from each other at the second axial location.

77. The method of claim 76, wherein the first pressure sensor is coupled to a positive input of a summer, and wherein the second pressure sensor is coupled to a negative input of the summer.

78. The method of claim 76, wherein the first and second distances comprise axial distances along the pipe.

79. The method of claim 76, wherein the first and second distances comprise circumferential distances around the pipe.

80. The method of claim 76, further comprising disposing at least one of the pressure sensors on a surface of the pipe.

81. The method of claim 80, wherein the surface is an outer surface of the pipe.

82. The method of claim 76, wherein at least one of the pressure sensors is in contact with the fluid in the pipe.

83. The method of claim 76, further comprising affixing at least one pressure sensor to a structure inside the pipe.

84. The method of claim 83, wherein the structure is cylindrical.

85. The method of claim 84, wherein the pressure sensor is selected from the group consisting of a piezoelectric strain gauge, a capacitive strain gauge, piezoresistive strain gauge, an accelerometer, and a hydrophone.

86. The method of claim 76, wherein at least one of the pressure sensors comprises a strain gauge.

87. The method of claim 76, wherein the strain gauge is a fiber optic strain gauge.

88. The method of claim 87, wherein the fiber optic strain gauge comprises at least one Bragg grating.

89. The method of claim 76, wherein at least one sensor is a fiber optic coil wrapped around the pipe.

90. The method of claim 89, wherein the fiber optic coil is bounded by Bragg gratings.

91. The method of claim 76, wherein the first, second, third and fourth pressure sensors are fiber optic sensors, and wherein the fiber optic sensors are multiplexed.

92. The method of claim 76, further comprising coupling the first pressure sensors to a positive input of a summer, and further comprising coupling the second pressure sensor to a negative input of the summer.

93. The method of claim 74, wherein the first and second filters share a common pressure sensor.

94. The method of claim 66, wherein processing the first and the second pressure signals comprises cross-correlating the first and second pressure signals to compute a time delay between the first and second pressure signals.

95. The method of claim 66, wherein processing the first and the second pressure signals further comprises a third filter coupled to either the first or second pressure signal, and wherein the third filter filters out a predetermined range of wavelength in the first or second pressure signal.

96. The method of claim 95, wherein the third filter comprises a band pass filter.

97. The method of claim 66, wherein the pipe is a petroleum production pipe deployed in a well.

98. A method for measuring a velocity of a fluid moving in a pipe, the fluid containing inhomogenous pressure disturbances, comprising:
  attaching a plurality of a axially-spaced pressure sensors to the outside of the pipe;
  detecting the inhomogeneous pressure disturbances at each pressure sensor, each pressure sensor providing a pressure signal;
  processing at least two of the plurality of pressure signals to provide a velocity signal indicative of the velocity of the fluid in the pipe.

99. The method of claim 98, wherein the inhomogenous pressure disturbances are stochastic within the fluid.

100. The method of claim 98, wherein the inhomogenous pressure disturbances are naturally occurring within the fluid.

101. The method of claim 98, wherein the inhomogenous pressure disturbances comprise vortices.

102. The method of claim 98, wherein the fluid comprises a fluid mixture.

103. The method of claim 102, wherein the velocity signal relates to the velocity of a constituent in the fluid mixture.

104. The method of claim 98, wherein the fluid mixture consists of any combination of oil, gas, or water.

105. The method of claim 98, wherein the plurality of pressure signals are filtered to filter out wavelengths above a predetermined wavelength.

106. The method of claim 98, wherein at least one of the pressure sensors comprises a strain gauge.

107. The method of claim 106, wherein the strain gauge is a fiber optic strain gauge.

108. The method of claim 107, wherein the fiber optic strain gauge comprises at least one Bragg grating.

109. The method of claim 106, wherein the strain gauge is selected from the group consisting of a piezoelectric strain gauge, a capacitive strain gauge, piezoresistive strain gauge, and an accelerometer.

110. The method of claim 98, wherein at least one pressure sensor is a fiber optic coil wrapped around the pipe.

111. The method of claim 110, wherein the fiber optic coil is bounded by Bragg gratings.

112. The method of claim 98, wherein the plurality of pressure sensors are fiber optic sensors, and wherein the fiber optic sensors are multiplexed.

113. The method of claim 98, wherein processing at least two of the plurality of pressure signals comprises cross-correlating the pressure signals to compute a time delay between the pressure signals.

114. The method of claim 98, wherein the pipe is a petroleum production pipe deployed in a well.

115. An apparatus for measuring a velocity of a fluid moving in a pipe, the fluid containing pressure disturbances, comprising:
  a plurality of pressure sensors attached to the outside of the pipe for non-intrusively measuring the pressure disturbances at a plurality of axial locations along the pipe, each sensor providing a pressure signal;
  a logic processing system, responsive to at least two of the plurality of pressure signals, for providing a velocity signal indicative of the velocity of the fluid in the pipe.

116. The apparatus of claim 115, wherein the pressure disturbances are stochastic within the fluid.

117. The apparatus of claim 115, wherein the pressure disturbances are naturally occurring within the fluid.

118. The apparatus of claim 115, wherein the pressure disturbances comprise vortices.

119. The apparatus of claim 115, wherein the fluid comprises a fluid mixture.

120. The apparatus of claim 119, wherein the velocity signal relates to the velocity of a constituent in the fluid mixture.

121. The apparatus of claim 115, wherein the fluid mixture consists of any combination of oil, gas, or water.

122. The apparatus of claim 115, wherein the plurality of sensors are configured to filter out wavelengths above a predetermined wavelength.

123. The apparatus of claim 115, wherein at least one of the pressure sensors comprises a strain gauge.

124. The apparatus of claim 123, wherein the strain gauge is a fiber optic strain gauge.

125. The apparatus of claim 124, wherein the fiber optic strain gauge comprises at least one Bragg grating.

126. The apparatus of claim 123, wherein the strain gauge is selected from the group consisting of a piezoelectric strain gauge, a capacitive strain gauge, piezoresistive strain gauge, and an accelerometer.

127. The apparatus of claim 115, wherein at least one pressure sensor is a fiber optic coil wrapped around the pipe.

128. The apparatus of claim 127, wherein the fiber optic coil is bounded by Bragg gratings.

129. The apparatus of claim 115, wherein the plurality of pressure sensors are fiber optic sensors, and wherein the fiber optic sensors are multiplexed.

130. The apparatus of claim 115, wherein the logic processing system comprises a cross-correlator, and wherein the plurality of pressure signals are in communication with the cross-correlator, and wherein the cross-correlator computes a time delay between at least two of the plurality of pressure signals.

131. The apparatus of claim 115, wherein the pipe is a petroleum production pipe deployed in a well.

132. A method for measuring a velocity of a fluid moving in a pipe, the fluid containing pressure disturbances, comprising:
  nonintrusively detecting the pressure disturbances at a first axial location along the pipe to provide a first pressure signal;
  nonintrusively detecting the pressure disturbances at a second axial location along the pipe to provide a second pressure signal; and
  processing the first and the second pressure signals to provide a velocity signal indicative of the velocity of the fluid in the pipe.

133. The method of claim 132, wherein the pressure disturbances are stochastic within the fluid.

134. The method of claim 132, wherein the pressure disturbances are naturally occurring within the fluid.

135. The method of claim 132, wherein the pressure disturbances comprise vortices.

136. The method of claim 132, wherein the fluid comprises a fluid mixture.

137. The method of claim 136, wherein the velocity signal relates to the velocity of a constituent in the fluid mixture.

138. The method of claim 132, wherein the fluid mixture consists of any combination of oil, gas, or water.

139. The method of claim 132, wherein the first and second pressure signals are filtered to filter out wavelengths above a predetermined wavelength.

140. The method of claim 132, wherein nonintrusively detecting the pressure disturbances at the first axial locating comprises the use of a first filter, and wherein nonintrusively detecting the pressure disturbances at the second axial location comprises the use of a second filter.

141. The method of claim 140, further comprising affixing the first and second filters to an outer surface of the pipe.

142. The method of claim 140, wherein the first filter comprises at least a first and a second pressure sensor disposed a first distance apart from each other at the first axial location, and wherein the second filter comprises at least a third and a fourth pressure sensor disposed a second distance apart from each other at the second axial location.

143. The method of claim 142, wherein the first pressure sensor is coupled to a positive input of a summer, and wherein the second pressure sensor is coupled to a negative input of the summer.

144. The method of claim 142, wherein the first and second distances comprise axial distances along the pipe.

145. The method of claim 142, wherein the first and second distances comprise circumferential distances around the pipe.

146. The method of claim 142, further comprising disposing at least one of the pressure sensors on a surface of the pipe.

147. The method of claim 146, wherein the surface is an outer surface of the pipe.

148. The method of claim 142, wherein at least one of the pressure sensors is in contact with the fluid in the pipe.

149. The method of claim 142, further comprising affixing at least one pressure sensor to a structure inside the pipe.

150. The method of claim 149, wherein the structure is cylindrical.

151. The method of claim 150, wherein the pressure sensor is selected from the group consisting of a piezoelectric strain gauge, a capacitive strain gauge, piezoresistive strain gauge, an accelerometer, and a hydrophone.

152. The method of claim 142, wherein at least one of the pressure sensors comprises a strain gauge.

153. The method of claim 142, wherein the strain gauge is a fiber optic strain gauge.

154. The method of claim 153, wherein the fiber optic strain gauge comprises at least one Bragg grating.

155. The method of claim 142, wherein at least one sensor is a fiber optic coil wrapped around the pipe.

156. The method of claim 155, wherein the fiber optic coil is bounded by Bragg gratings.

157. The method of claim 142, wherein the first, second, third and fourth pressure sensors are fiber optic sensors, and wherein the fiber optic sensors are multiplexed.

158. The method of claim 142, further comprising coupling the first pressure sensor to a positive input of a summer, and further comprising coupling the second pressure sensor to a negative input of the summer.

159. The method of claim 140, wherein the first and second filters share a common pressure sensor.

160. The method of claim 132, wherein processing the first and the second pressure signals comprises cross correlating the first and second pressure signals to compute a time delay between the first and second pressure signals.

161. The method of claim 132, wherein processing the first and the second pressure signals further comprises a third filter coupled to either the first or second pressure signal, and wherein the third filter filters out a predetermined range of wavelengths in the first or second pressure signal.

162. The method of claim 161, wherein the third filter comprises a band pass filter.

163. The method of claim 132, wherein the pipe is a petroleum production pipe deployed in a well.

164. A method for measuring a velocity of a fluid moving in a pipe, the fluid containing pressure disturbances, comprising:

attaching a plurality of axially-spaced pressure sensors to the outside of the pipe;

nonintrusively detecting the pressure disturbances at each pressure sensor, each pressure sensor providing a pressure signal;

processing at least two f the plurality of pressure signals to provide a velocity signal indicative of the velocity of the fluid in the pipe.

165. The method of claim 164, wherein the pressure disturbances are stochastic within the fluid.

166. The method of claim 164, wherein the pressure disturbances are naturally occurring within the fluid.

167. The method of claim 164, wherein the pressure disturbances comprise vortices.

168. The method of claim 164, wherein the fluid comprises a fluid mixture.

169. The method of claim 168, wherein the velocity signal relates to the velocity of a constituent in the fluid mixture.

170. The method of claim 164, wherein the fluid mixture consists of any combination of oil, gas, or water.

171. The method of claim 164, wherein the plurality of pressure signals are filtered to filter out wavelengths above a predetermined wavelength.

172. The method of claim 164, wherein at least one of the pressure sensors comprises a strain gauge.

173. The method of claim 172, wherein the strain gauge is a fiber optic strain gauge.

174. The method of claim 173, wherein the fiber optic strain gauge comprises at least one Bragg grating.

175. The method of claim 172, wherein the strain gauge is selected from the group consisting of a piezoelectric strain gauge, a capacitive strain gauge, piezoresistive strain gauge, and an accelerometer.

176. The method of claim 164, wherein at least one pressure sensor is a fiber optic coil wrapped around the pipe.

177. The method of claim 176, wherein the fiber optic coil is bounded by Bragg gratings.

178. The method of claim 164, wherein the plurality of pressure sensors are fiber optic sensors, and wherein the fiber optic sensors are multiplexed.

179. The method of claim 164, wherein processing at least two of the plurality of pressure signals comprises cross correlating the pressure signals to compute a time delay between the pressure signals.

180. The method of claim 164, wherein the pipe is a petroleum production pipe deployed in a well.

* * * * *

UNITED STATES PATENT AND TRADEMARK OFFICE
CERTIFICATE OF CORRECTION

PATENT NO.   : 6,691,584 B2
DATED        : February 17, 2004
INVENTOR(S)  : Gysling et al.

It is certified that error appears in the above-identified patent and that said Letters Patent is hereby corrected as shown below:

Column 19,
Lines 53 and 55, please change "or" to -- of --.

Column 20,
Line 55, please change "apparatus claim" to -- apparatus of claim --.

Column 21,
Line 8, please change "alone" to -- along --.

Column 26,
Line 21, please change "two f the" to -- two of the --.

Signed and Sealed this

Thirteenth Day of July, 2004

JON W. DUDAS
*Acting Director of the United States Patent and Trademark Office*